United States Patent
Kim et al.

(10) Patent No.: US 12,387,186 B2
(45) Date of Patent: Aug. 12, 2025

(54) METHOD AND SYSTEM FOR MANAGING POINTS IN KARAOKE APPLICATION BY USING BLOCKCHAIN NETWORK

(71) Applicant: EMEL VENTURES, INC., Seoul (KR)

(72) Inventors: Heuibae Kim, Seongnam-si (KR); Hyunkeun Yoon, Namyangju-si (KR); Kyuyup Kim, Seoul (KR)

(73) Assignee: EMEL VENTURES, INC., Seoul (KR)

( * ) Notice: Subject to any disclaimer, the term of this patent is extended or adjusted under 35 U.S.C. 154(b) by 299 days.

(21) Appl. No.: 17/604,989

(22) PCT Filed: Sep. 5, 2019

(86) PCT No.: PCT/KR2019/011458
§ 371 (c)(1),
(2) Date: Oct. 19, 2021

(87) PCT Pub. No.: WO2021/040113
PCT Pub. Date: Mar. 4, 2021

(65) Prior Publication Data
US 2022/0215360 A1    Jul. 7, 2022

(30) Foreign Application Priority Data
Aug. 26, 2019  (KR) .................. 10-2019-0104354

(51) Int. Cl.
| | |
|---|---|
| *G06Q 20/12* | (2012.01) |
| *G06Q 20/06* | (2012.01) |
| *G06Q 20/36* | (2012.01) |
| *G06Q 20/38* | (2012.01) |
| *G06Q 30/0207* | (2023.01) |

(52) U.S. Cl.
CPC ........ *G06Q 20/123* (2013.01); *G06Q 20/065* (2013.01); *G06Q 20/367* (2013.01); *G06Q 20/3829* (2013.01); *G06Q 30/0207* (2013.01); *G06Q 30/0215* (2013.01)

(58) Field of Classification Search
CPC .. G06Q 20/123; G06Q 20/065; G06Q 20/367; G06Q 20/3829; G06Q 30/0207; G06Q 30/0215; G06Q 30/02; G06Q 50/10
See application file for complete search history.

(56) References Cited

FOREIGN PATENT DOCUMENTS

| | | | |
|---|---|---|---|
| CN | 105224668 A * | 1/2016 | ........... G06F 16/635 |
| JP | 2018-077640 | 5/2018 | |
| KR | 10-2007-0035371 | 3/2007 | |

(Continued)

OTHER PUBLICATIONS

On the Understanding of Gamification in Blockchain Systems Reza M. Parizi and Ali Dehghantanha (Year: 2018).*

(Continued)

*Primary Examiner* — Alexandru Cirnu

(57) ABSTRACT

The present invention relates to a method and a system for distributing points in a karaoke application and, more specifically, to a method and a system for managing points in a karaoke application by using a blockchain network, wherein the concept of "point" is introduced in connection with using the karaoke application so as to provide reasonable incentives to providers of song images while inducing active participation in the karaoke application from users, and transparent and efficient management thereof is possible.

9 Claims, 27 Drawing Sheets

(56) References Cited

FOREIGN PATENT DOCUMENTS

| KR | 10-2014-0015729 | 2/2014 |
|---|---|---|
| KR | 10-2018-0000196 | 1/2018 |
| KR | 10-2018-0121483 | 11/2018 |
| KR | 10-1996166 | 7/2019 |
| WO | WO2018234482 A1 | 12/2018 |

OTHER PUBLICATIONS

Office Action for Korea Patent Application No. 10-2019-0104354, dated Dec. 22, 2020.
Office Action for Korea Patent Application No. 10-2019-0104354, dated Jul. 29, 2021.
PCT International Search Report and Written Opinion for International Application No. PCT/KR2019/011458, dated May 26, 2020.
Office Action for Korea Patent Application No. 10-2019-0104350, dated Dec. 22, 2020.
Office Action for Korea Patent Application No. 10-2019-0104350, dated Jul. 29, 2021.
"Singing Room, Meeting with the Blockchain . . . Sing and Get rewarded" ZDnet Korea(posted May 17, 2019), <URL: http://zdnet.co.kr/view/?no=20190516171834>.

\* cited by examiner

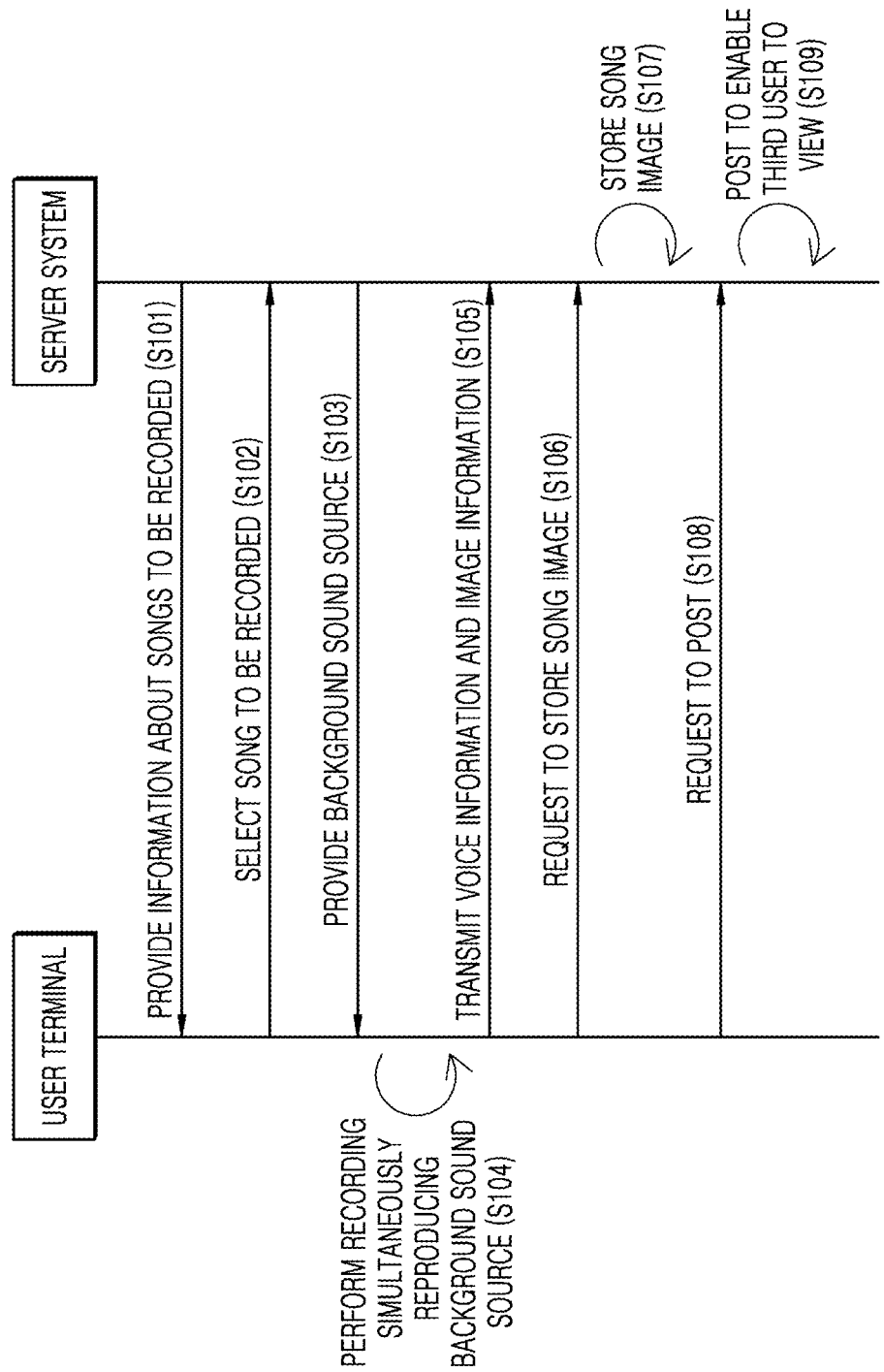

FIG. 6A

AGREEMENT ON USING A FUNCTION OF SAVING SONGS

FOR SAVING SONGS THAT YOU SING, YOU NEED TO PAY AN INITIAL ONE-TIME DEPOSIT (500 SSX).

. . . . . .  ⊗

My SSX : 5,000 SSX

· UPON WITHDRAWAL, THE DEPOSIT WILL BE REFUNDED TO THE YOUR PERSONAL WALLET.

| CANCEL | AGREE |

FIG. 6B

POSTING  ✕

▶ SEEING YOU
PAUL KIM

LEAVE A COOL MESSAGE TO PROMOTE YOUR SONG!

DEPOSIT FOR POSTING
USE SSX TO POST.
My SSX : 4,500 SSX

POSTING AMOUNT (MINIMUM 10, MAXIMUM 2000)0 SSX

PLEASE ENTER SSX TO POST.

SSX PASSWORD

PLEASE ENTER YOUR SSX PASSWORD.

POSTING

METHOD AND SYSTEM FOR MANAGING POINTS IN KARAOKE APPLICATION BY USING BLOCKCHAIN NETWORK

TECHNICAL FIELD

The present invention relates to a method and a system for managing points in a karaoke application by using a blockchain network, and more particularly, to a method and a system for managing points in a karaoke application by using a blockchain network, wherein the concept of "point" is introduced in connection with using the karaoke application so as to provide reasonable incentives to providers of song images while inducing active participation in the karaoke application from users, and transparent and efficient management thereof is possible.

BACKGROUND ART

Since karaoke was established in Japan in 1970, the karaoke is still prosperous in Asia. The development of the Internet and mobile devices led to an online karaoke platform from the offline karaoke. Based on the white paper about Japanese karaoke in 2017, the karaoke population in Japan reached 47 million in 2016, and Tencent Music of China recently listed on the New York Stock Exchange, has 800 million monthly active users of an online karaoke platform.

For the existing karaoke app service, a user can test some provided songs for free and sing various songs after performing a payment. Because costs for copyright, sound sources, and service server maintenance are required to be paid in order to provide continuous services, the paid services have been taken for granted.

However, in the case of paid services, considerable number of users may leave the service due to the fee-for-service even when marketing is conducted to recruit users, thereby decreasing the number of actual users and causing difficulty in a service operation aspect.

In the case of the existing karaoke app service, although the users may pay and use all platforms/services, it is uneconomical to reward the users for contents produced through recording songs (and images) by the users, so it is difficult to have a pleasure other than singing in the existing karaoke app service, and interactions with other users are very rare.

In addition, there has been no alternative in terms of cost and transparency for operating a system of managing the details of the above compensation.

DISCLOSURE

Technical Problem

The present invention relates to a method and a system for managing points in a karaoke application by using a blockchain network, in which the concept of "point" is introduced in connection with using the karaoke application so as to provide reasonable incentives to providers of song images while inducing active participation in the karaoke application from users, and transparent and efficient management thereof is possible.

Technical Solution

In order to solve the above problem, one embodiment of the present invention provides a method for managing points in a karaoke application using a blockchain network and performed in a server system, and the method includes: a transaction receiving step in which a user in the karaoke application may post about a song image of the user or perform sponsorship for a song image of another user, information about points held for each user's wallet, and information about points held for each wallet of the posted song images are recorded in the blockchain network, and information about a transaction requesting a point transfer from a wallet of a specific user to a wallet of a specific song image is received directly or indirectly from a karaoke application performed on a user terminal; and a record requesting step of requesting one or more nodes of the blockchain network to perform recording in a block of the blockchain network based on the information about the transaction.

According to one embodiment of the present invention, the method for managing points in a karaoke application may further include: a wallet creation step of creating a new wallet when a new user joins for one or more nodes of the blockchain network, requesting private key information for the new wallet, and transmitting the private key information for the new wallet received from the one or more nodes to a user terminal.

According to one embodiment of the present invention, points held by the wallet of the corresponding song image may be increased by the transaction receiving step and the record requesting step according to an input of sponsorship for the corresponding song image of the user terminal during a predetermined sponsorship period, the points held in the wallet of the corresponding song image may not be allowed to be transferred to other external wallets during the predetermined sponsorship period.

According to one embodiment of the present invention, the method for managing points in a karaoke application may further include: a point distributing step of transferring a part of the points held in the wallet of the corresponding song image to wallets of some of users sponsoring the corresponding song image and a wallet of a user providing the corresponding song image, after expiration of the predetermined sponsorship period for the corresponding song image set in the server system.

According to one embodiment of the present invention, the node of the blockchain network includes a smart contract module, and after expiration of the predetermined sponsorship period for the corresponding song image set in the server system, the transferring a part of the points held in the wallet of the corresponding song image to wallets of some of users sponsoring the corresponding song image and a wallet of a user providing the corresponding song image may be recorded in the blockchain network by the smart contract module.

According to one embodiment of the present invention, the information about the transaction in the transaction receiving step may include: information related to a wallet of the specific user; information related to a wallet of the specific song image; information about transferred points; and a hash value for at least one of the information related to the wallet of the specific user, the information related to the wallet of the specific song image, and the information about the transferred points.

According to one embodiment of the present invention, the transaction may include: a posting transaction in which a provider of the corresponding song image transfers points from a wallet of the provider to the wallet of the corresponding song image; a support transaction for transferring points from a wallet of a third user to the wallet of the corresponding song image during a first sponsorship period for the corresponding song image; and a gift transaction for transferring points from a wallet of a third user to the wallet of the corresponding song image during a second sponsorship period after the first sponsorship period for the corresponding song image.

According to one embodiment of the present invention, the nodes of the blockchain network includes a smart contract module for recording the transfers of the points according to the posting transaction, the support transaction, and the gift transaction in a block of the blockchain network, and the record requesting step may include requesting the smart contract module to perform a function according to the transaction based on the information about the transaction.

According to one embodiment of the present invention, the corresponding song image is configured to be stored in the server system by an input of the user in the karaoke application, information about points of a deposit wallet for receiving deposit points for the stored song images is recorded in the blockchain network, and the transaction includes: a deposit transaction in which the user who wants to store the corresponding song image in the server system transfers points from the wallet of the user to the deposit wallet at a cost for storing the corresponding song image in the server system; and a recovery transaction in which points are transferred from the deposit wallet to the wallet of the user who wants to store the corresponding song image in the server system, wherein the recovery transaction may be performed when the user withdraws from a use of the karaoke application or deletes the corresponding song image from a server.

In order to solve the above problem, one embodiment of the present invention provides a system for managing points in a karaoke application using a blockchain network and implemented by a server system including one or more computing devices including one or more processors and one or more memories, and the system includes: a transaction receiving unit in which a user in the karaoke application may post about a song image of the user or perform sponsorship for a song image of another user, information about points held for each user's wallet, and information about points held for each wallet of the posted song images are recorded in the blockchain network, and information about a transaction requesting a point transfer from a wallet of a specific user to a wallet of a specific song image is received directly or indirectly from a karaoke application performed on a user terminal; and a record requesting unit for requesting one or more nodes of the blockchain network to perform recording in a block of the blockchain network based on the information about the transaction.

In order to solve the above problem, one embodiment of the present invention provides a method for distributing points in a karaoke application performed in a server system, and the method includes: a posting step of performing a posting to allow a third user to view a song image received from a user terminal of a song image provider who wants to post the song image; a first sponsorship step of providing the posted song image to a user terminal of the third user during a predetermined first period, receiving first sponsorship information including information about points to be sponsored from a user terminal of a sponsor who wants to sponsor the corresponding song image, and accumulating the points for the corresponding song image; a second sponsorship step of providing the posted song image to a user terminal of a third user during a predetermined second period after the first period, receiving second sponsorship information including information about points to be sponsored from a user terminal of a sponsor who wants to sponsor the corresponding song image, and accumulating the points for the corresponding song image; a distributing step of distributing the accumulated points for the corresponding song image to the user having posted the corresponding song image and the user having sponsored during the first period.

According to one embodiment of the present invention, each account of a user capable of posting a song image of the user or sponsoring a song image of another person may hold points, and each of the posted song images may hold points.

According to one embodiment of the present invention, the posting step may include: providing a background sound source for recording to the user terminal of the song image provider; receiving voice information or voice information and image information recorded in the user terminal of the song image provider; a server storage step of storing a song image formed by combining the voice information or the voice information and the image information with the background sound source in the server system upon input of the song image provider; and a posting input step of posting the song image stored in the server system upon the input of the song image provider to allow the third user to view the song image.

According to one embodiment of the present invention, in the server storage step and the posting input step, the points held by the song image provider may be reduced.

According to one embodiment of the present invention, in the posting step, information about points inputted for the song image may be received from the song image provider, and in the first sponsorship step, the points may be sorted based on the accumulated sponsorship points for each song image and provided to user terminals of third users.

According to one embodiment of the present invention, the first sponsorship step may include: providing a list of song images sequentially sorted according to sizes of the sponsorship points of each song image to the user terminal; providing a corresponding song image to the user terminal in response to a selection input for the corresponding song image from the user terminal; receiving the first sponsorship information from the user terminal; and accumulating sponsorship points for the corresponding song image based on the first sponsorship information.

According to one embodiment of the present invention, the sponsorship according to the first sponsorship information of the sponsor for the corresponding song image in the first sponsorship step may not be allowed to be withdrawn.

According to one embodiment of the present invention, the second sponsorship step may include: providing a list of song images sequentially sorted according to sizes of the sponsorship points of each song image to the user terminal; providing a corresponding song image to the user terminal in response to a selection input for the corresponding song image from the user terminal; receiving the second sponsorship information from the user terminal; and accumulating sponsorship points for the corresponding song image based on the second sponsorship information.

According to one embodiment of the present invention, in the distributing step, the distribution to the sponsors having performed the sponsorship in the first sponsorship step may be performed based on the sizes of sponsorship points of the sponsors in the first sponsorship step.

According to one embodiment of the present invention, the server system includes a blockchain network or one or more nodes connected to the blockchain network, and the point may be a virtual currency based on a blockchain network.

In order to solve the above problem, the present invention provides a system for distributing points in a karaoke application implemented by one or more computing devices including one or more processors and one or more memories, and the system includes: a posting unit for performing a posting to allow a third user to view a song image received from a user terminal of a song image provider who wants to post the song image; a first sponsorship receiving unit for providing the posted song image to a user terminal of the third user during a predetermined first period, receiving first sponsorship information including information about points to be sponsored from a user terminal of a sponsor who wants to sponsor the corresponding song image, and accumulating the points for the corresponding song image; a second sponsorship receiving unit for providing the posted song image to a user terminal of a third user during a predetermined second period after the first period, receiving second sponsorship information including information about points to be sponsored from a user terminal of a sponsor who wants to sponsor the corresponding song image, and accumulating the points for the corresponding song image; and a distributing unit for distributing the accumulated points for the corresponding song image to the user having posted the corresponding song image and the user having sponsored during the first period.

Advantageous Effects

One embodiment of the present invention may provide a method and a system for distributing points in a karaoke application in which reasonable incentives can be provided to providers of song images by introducing a sponsorship approach for inducing active participation of users and providing new interest to users, so that copyrights and system operation costs related to operations of the karaoke application can be created inside the system.

According to one embodiment of the present invention, a wallet is created for each song content produced by a user, and points accumulated through the sponsorship of other users who sympathized with the content are returned to the corresponding user and the other sponsoring users, so that the user-centered compensation can be promoted.

According to one embodiment of the present invention, transfers and details of points according to the use of the karaoke application can be fairly and transparently managed, and system costs for managing the points can be reduced.

According to one embodiment of the present invention, the function, such as posting and sponsoring song images, of the karaoke application can encourage users to participate in the karaoke application, the value of points in the karaoke application can be increased as the user participation in the karaoke application is increased, and the increased value of points can induce more users to participate in the karaoke application, so that a virtuous cycle structure can be implemented.

DESCRIPTION OF DRAWINGS

FIG. 4 schematically shows detailed steps of a posting step according to one embodiment of the present invention.

FIG. 6 schematically shows an example of a screen displayed on a user terminal in the posting step according to one embodiment of the present invention.

BEST MODE

Mode for Invention

Figure 1:
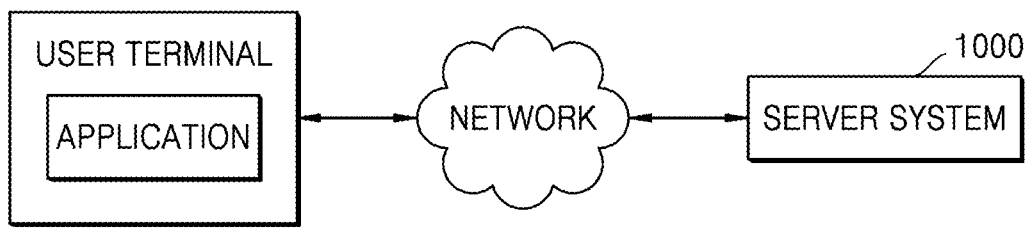
FIG. 1 schematically shows an entire system of performing a method for distributing points in a karaoke application according to one embodiment of the present invention.

Hereinafter, embodiments of the present invention will be described in detail with reference to the accompanying drawings, so that a person having ordinary skill in the art may easily carry out the present invention. However, the invention may be embodied in various different forms and is not limited to the embodiments described herein. In addition, parts irrelevant to the description are omitted in the drawings to clearly describe the present invention, and like reference numerals designate like parts throughout the specification.

Throughout the specification, when a part is "connected" to another part, the above expression includes not only "directly connected" but also "electrically connected" in which another element is interposed therebetween. In addition, when a part "includes" a certain component, the above expression does not exclude other elements, but may further include the other elements, unless particularly stated otherwise In addition, the terms including an ordinal number such as first and second may be used to describe various elements, however, the elements are not limited by the terms. The terms are used only for the purpose of distinguishing one element from another element. For example, the first element may be referred to as the second element without departing from the scope of the present invention, and similarly, the second element may also be referred to as the first element. The term "and/or" includes any one of a plurality of related listed items or a combination thereof.

In the specification, the term 'unit' includes a unit implemented by hardware, a unit implemented by software, and a unit implemented by both of the hardware and the software. In addition, one unit may be implemented using at least two pieces of hardware, and at least two units may be implemented by one piece of hardware. Meanwhile, "~ unit" may not be limited to software or hardware, may be configured to present in an addressable storage medium, and may be configured to reproduce at least one processor. Accordingly, as an example, the '~ unit' includes components such as software components, object-oriented software components, class components, and task components, processes, functions, attributes, procedures, subroutines, segments of program code, drivers, firmware, microcode, circuits, data, databases, data structures, tables, arrays and variables. The functionality provided within the components and the '~ unit's may be combined into a smaller number of components and '~ unit's or further separated into additional components and the '~ unit's. In addition, the components and '~ unit's may be implemented to reproduce at least one CPU in a device or a secure multimedia card. The interpretation of "module" and "component" mentioned below is subject to the above-mentioned "~ unit".

The "user terminal" referred to below may be implemented as a computer or portable terminal that can access a server or other terminals through a network. The computer includes, for example, a notebook computer, a desktop, a laptop, and the like installed with a web browser, the portable terminal, for example, refers to a wireless communication device that guarantees portability and mobility, and may include all kinds of handheld-based wireless communication devices such as smart phone, personal communication system (PCS), global system for mobile communications (GSM), personal digital cellular (PDC), personal handyphone system (PHS), personal digital assistant (PDA), international mobile telecommunication (IMT)-2000, code division multiple access (CDMA)-2000, W-code division multiple access (W-CDMA), wireless broadband internet (Wibro) terminals. In addition, the "network" may be implemented by a wired network such as a local area network (LAN), a wide area network (WAN) or a value added network (VAN), and all types of wireless network such as a mobile radio communication network, or a satellite network.

The "point" mentioned below may correspond to a token, point, virtual currency, money, or an element corresponding to actual money inside the server system in the method or system of the present invention, and may correspond to an element having a value that may occur between owners in the server system.

The "point" may correspond to intangible goods interchangeable with other goods or tokens, points, virtual currencies, money, or elements corresponding to the money in a system outside the server system.

The "point" may include, as an example, a token usable inside the service server, or a virtual currency usable in the service server and interchangeable with other tokens (such as virtual currencies) in an external exchange. The "point" may have monetary value, and transactions may occur inside and/or outside the server system.

In some embodiments of the present invention, the "point" may be implemented in the form of being recorded in the server system in which nodes is entirely or partially related to a distributed ledger of the blockchain network.

FIG. 1 schematically shows an entire system of performing a method for distributing points in a karaoke application according to one embodiment of the present invention.

The user may use the karaoke application by accessing a server system 1000 through an application of a user terminal. The user, basically, may select a song to sing through the karaoke application, and simultaneously, record a singing voice of the user through a microphone provided in the user terminal while listening to background music of the song through earphones or the like.

The application shown in FIG. 1 preferably corresponds to the aforementioned karaoke application. The user may register the user in the server system 1000 through a predetermined registration procedure provided by the application, and the application may interact with the user based on the data provided to the server system 1000, so that the user may use the karaoke application.

According to one embodiment of the present invention, the application is a karaoke application, and the posting, sponsoring, wallet-checking and the like described later may be performed through the karaoke application.

The server system 1000 may be configured by one or more computing devices including one or more memories and one or more processors. The above server system 1000 manages managements and operations of the application, stores users' information, sound source data, and song image data, and manages user' points described later.

The server system 1000 may be composed of a single computing device, but in some embodiments of the present invention, may be composed of a plurality of physically separated computing devices. In some embodiments of the present invention, the server system 1000 may include a service server configured to perform direct data transmission and reception with respect to the application operated in the user terminal, and a blockchain network that transmits and receives data to and from the service server and/or the user terminal.

As described above, the application may perform functions such as interaction with other users (for example, commenting) in addition to the function of the karaoke application itself. However, hereinafter, embodiments of the present invention will be described focusing on posting a song image of the user through the application by the user, and following sponsorship, distribution, and the like.

Figure 2:
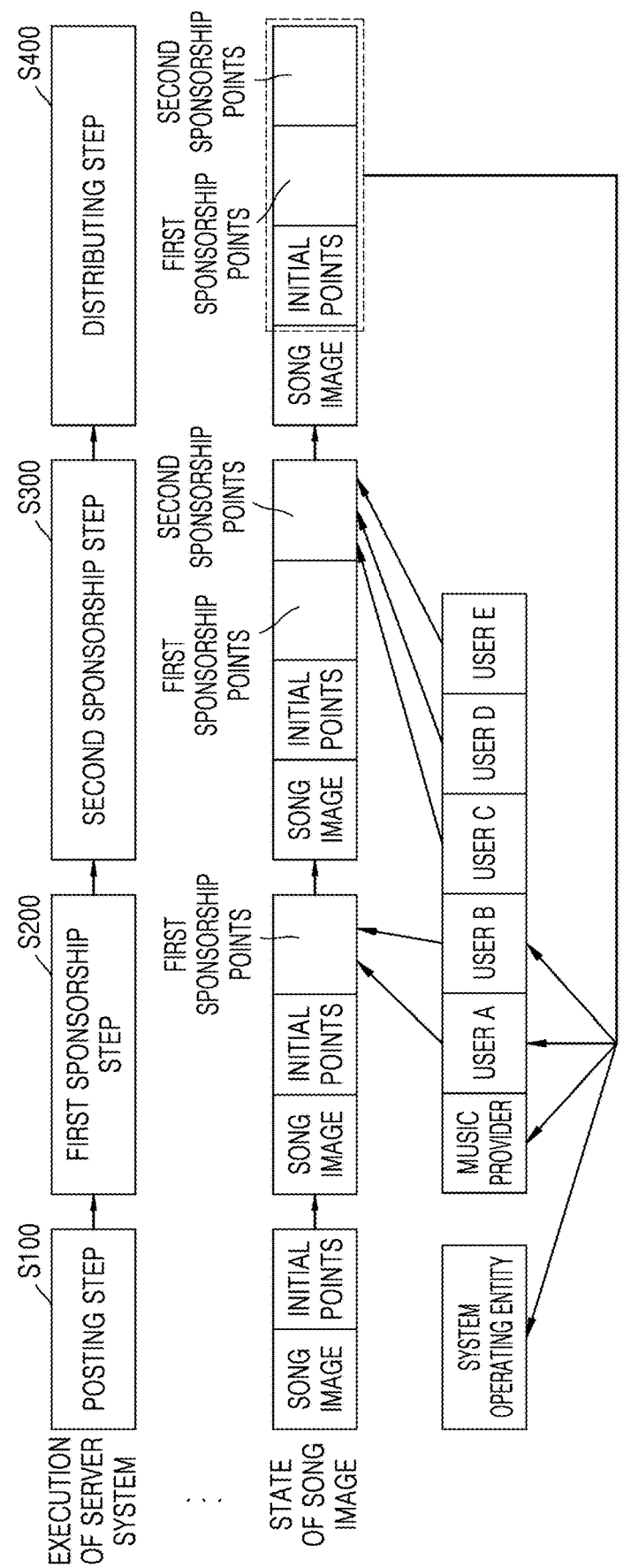
FIG. 2 schematically shows steps of the method for distributing the points in the karaoke application according to one embodiment of the present invention.

FIG. 2 schematically shows steps of the method for distributing the points in the karaoke application according to one embodiment of the present invention.

The aforementioned interaction with the user terminal is required in the entire process of point distribution of the karaoke application. Hereinafter, the method for distributing points in the karaoke application performed in the server system according to one embodiment of the present invention will be described in a viewpoint of the server system 1000.

Step S100 includes performing a posting step of performing a posting to allow a third user to view a song image received from a user terminal of a song image provider who wants to post the song image.

In step S100, a song image is posted in the server system 1000. Thereafter, the song image may be checked through application or the like even by a third user. In step S100, the song image provider may sponsor or grant points to the song image of the song image provider. Accordingly, in step S200, more sponsors may be collected.

Step S200 includes performing a first sponsorship step of providing the posted song image to a user terminal of the third user during a predetermined first period, receiving first sponsorship information including information about points to be sponsored from a user terminal of a sponsor who wants to sponsor the corresponding song image, and accumulating the points for the corresponding song image.

In step S200, points sponsored by users for the corresponding song image are accumulated. In step S200, information about the points (initial points+first sponsorship points) accumulated in the song image may be provided to the third user together with the song image.

Step S300 includes performing a second sponsorship step of providing the posted song image to a user terminal of a third user during a predetermined second period after the first period, receiving second sponsorship information including information about points to be sponsored from a user terminal of a sponsor who wants to sponsor the corresponding song image, and accumulating the points for the corresponding song image.

In step S300, points sponsored by users for the corresponding song image are accumulated. In step S200, information about the points (initial points+first sponsorship points+second sponsorship points) accumulated in the song image may be provided to the third user together with the song image.

Preferably, a period for performing the second sponsorship step is longer than a period for performing the first sponsorship step. For example, the period for performing the first sponsorship step may be one week, and the period for performing the second sponsorship step may be four weeks.

Step S400 includes performing a distributing step of distributing the accumulated points for the corresponding song image to the user having posted the corresponding song image and the user having sponsored during the first period.

Through the processes described above, incentives may be given to the song image provider and incentives for sponsorship may be given to the sponsors having sponsored in the first sponsorship step.

Since the sponsors in the first sponsorship step may expect the profit share based on not only the sponsorship for the song image but also details of the sponsorship in the second sponsorship step, the above distribution method of the present invention may facilitate more users to participate in the service provided by the server system 1000. In the first sponsorship step, the user may sponsor a song image considered as promising, so as to generate profits.

In addition, the users may purely sponsor the corresponding song image in the second sponsorship step.

Preferably, the points accumulated in the song image through the above process may be distributed to the song image provider, the sponsors in the first sponsorship step, and a system operating entity. The above distribution may induce more song image providers to participate, and may induce the song image providers to post song images having higher quality. At the same time, the distribution may promote more users that may become sponsors to participate in the service, and may encourage the users to more actively conduct sponsorship activities.

In addition, since the accumulated points may be distributed to the system operating entity operating the entire of the server system 1000 or a part of the server system 1000, the system operating entity can pay costs required for operations of the server system 1000 according to the embodiments of the present invention, copyrights of sound sources, and the like and generate profits, so that the fee-free type karaoke application can be maintained.

Alternatively the system operating entity may include copyright owners directly.

Figure 3:
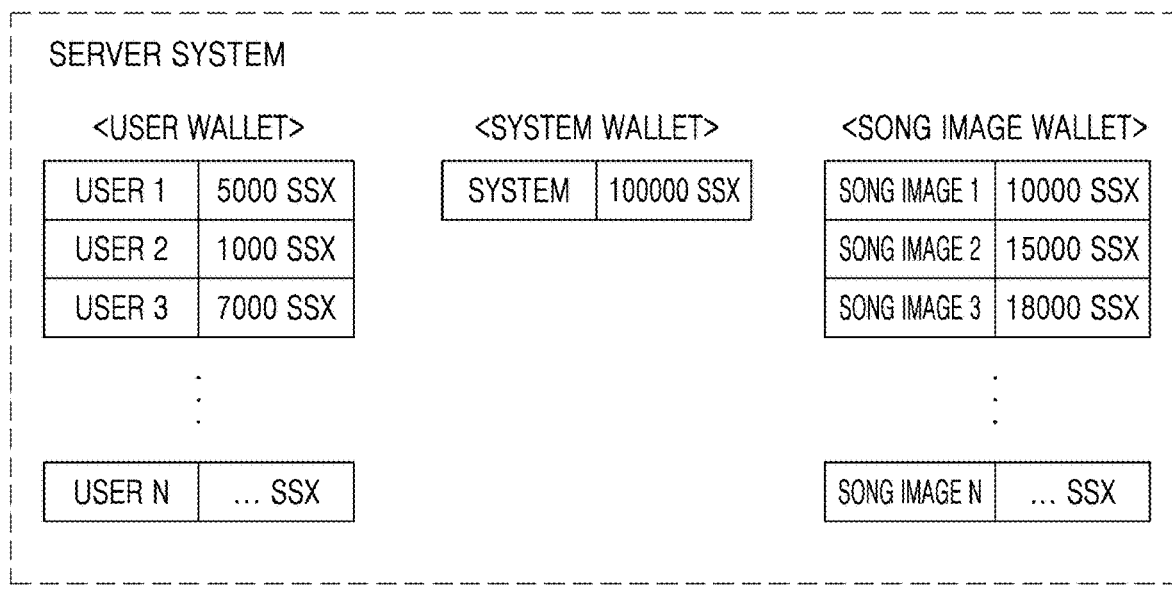
FIG. 3 shows an example of points held in each account or wallet of users, a system, and song images in a server system according to one embodiment of the present invention.

FIG. 3 shows an example of points held in each account or wallet of users, a system, and song images in the server system 1000 according to one embodiment of the present invention.

According to one embodiment of the present invention, each account of a user capable of posting a song image of the user or sponsoring a song image of another person may hold a wallet (or address) of the account, and information about points held in each wallet is recorded in the server system 1000.

The user may use or deduct the points from the wallet of the user, and may store a song image, post a song image, or sponsor a song image of another user.

Likewise, each song image has its own wallet (or address), and information about points held in each wallet is recorded in the server system 1000. When the user sponsors the corresponding song image through the first and second sponsorship steps, points held in the wallet of the corresponding song image are accumulated.

Thereafter, when the second sponsorship step is completed, the points accumulated in the corresponding song image are distributed to the wallets of the sponsors in the first sponsorship step, the wallet of the song image provider, and the wallet of the system operating entity.

Likewise, the system operating entity has its own wallet (or address), and information about points held in each wallet is recorded in the server system 1000. The wallet of the system operating entity may be implemented as a plurality of wallets instead of a single wallet.

According to one embodiment of the present invention, the information about the points held in each wallet described above may be recorded in the server system 1000 in the form of total points held in the wallets. In another embodiment of the present invention, transactions occurring in the wallets may be recorded in the server system 1000, and the points held in each wallet may be calculated by integrating the transactions.

According to one embodiment of the present invention, the wallet may denote a wallet referred to in a blockchain network system. According to one embodiment of the present invention, the wallet may be implemented by an encryption key related to a digital signature. For example, the server system 1000 may apply an asymmetric key method, in which the address of the wallet may correspond to a public key, and the transaction for the corresponding wallet may be implemented in the form of being signed by a private key inputted or stored in the user terminal and verified in the server system 1000.

FIG. 4 schematically shows detailed steps of a posting step according to one embodiment of the present invention.

In step S101, the server system 1000 provides information about a song to be recorded to the user terminal. According to one embodiment of the present invention, a list of songs to be recorded may be provided according to a user's input (such as a search input, and a category input).

In step S102, the user selects a song to be recorded by the user through an input from the application.

In step S103, the server system 1000 provides a background sound source for recording to the user terminal of the song image provider. The background sound source may include accompaniment, MR, or accompaniment sound source.

In step S104, the user terminal plays the received background sound source, and the user listens to the background sound source through earphones or the like and conducts recording through a microphone provided in the user terminal. According to one embodiment of the present invention, only the voice is recorded. However, in another embodiment of the present invention, images of a user singing a song may be photographed while recording the voice. Alternatively, the voice recording and/or the image photographing may be performed based on selection of the user.

In step S105, the server system 1000 receives voice information or voice information and image information recorded in the user terminal of the song image provider. Step S106 includes performing a server storage step of storing a song image formed by combining the voice information or the voice information and the image information with the background sound source in the server system 1000 upon input of the song image provider.

Preferably, the user may check the recording performed through step S104 in the terminal of the user, However, in order to store the recording, the recording is stored in the server system 1000 through steps S105 and S106, and then the song image stored in the server system 1000 may be checked through the application.

More preferably, in order to perform step S107, the user is required to pay predetermined points from the wallet of the user to the server system 1000. The above points paid may be refunded when the user deletes the corresponding song or withdraws the server system 1000. This is because a part of points that can flow from wallets existing in the server system 1000 is deposited to an account related to the system operating entity, thereby performing a kind of staking of points, and accordingly, the number of points that can flow is reduced even when the total amount of points has no change, thereby further increasing the value of the points. In particular, when the point is a virtual currency operated by a blockchain network, there is an advantage in that the value of virtual currency can be further increased through the staking.

In step S108, the song image provider requests to post the song image stored through the application. Step S109 includes performing a posting input step of posting the song image stored in the server system 1000 upon the input of the song image provider to allow the third user to view the song image.

Preferably, in steps S108 and S109, the song image provider may sponsor the song image which the song image provider wants to post. This is because, as described hereinafter, a display order of the list of song images posted in the first sponsorship step is determined based on the points accumulated in the corresponding song image.

Accordingly, the user may sponsor the song image of the user using points such that the song image of the user is initially exposed to more users in the first sponsorship step.

In other words, in the posting step, information about points inputted for the song image may be received from the song image provider, and in the first sponsorship step, song images is sequentially sorted according to the accumulated sponsorship points and provided to the user terminal of the third user.

According to one embodiment of the present invention, the point distribution to the song image provider in the distribution step may be determined based on the amount of self-sponsored points in steps S108 and S109 described above. In other words, when the song image provider sponsors more points for the song image provider in S108 and S109, the amount of points, which may be provided to the song image provider, may be increased.

In other words, as described above, the points held by the song image provider may be reduced in the server storage step and/or the posting input step.

Preferably, in the server storage step, the points required to be used by the song image provider may be fixed at a predetermined amount, and in the post input step, the points used by the song image provider may be set by the user.

FIG. 5 schematically shows an example of a screen displayed on a user terminal in the posting step according to one embodiment of the present invention.

Figure 5A:
FIG. 5 schematically shows an example of a screen displayed on a user terminal in the posting step according to one embodiment of the present invention.

FIG. 5(A) is a screen of the user terminal when steps S101 and S102 described above are performed. As shown in FIG. 5, the user may select a song that the user wants to sing in a song list extracted by selecting a category tab (such as "Duet Invitation", "Popular Songs", "Latest Songs") or performing a search.

Figure 5B:
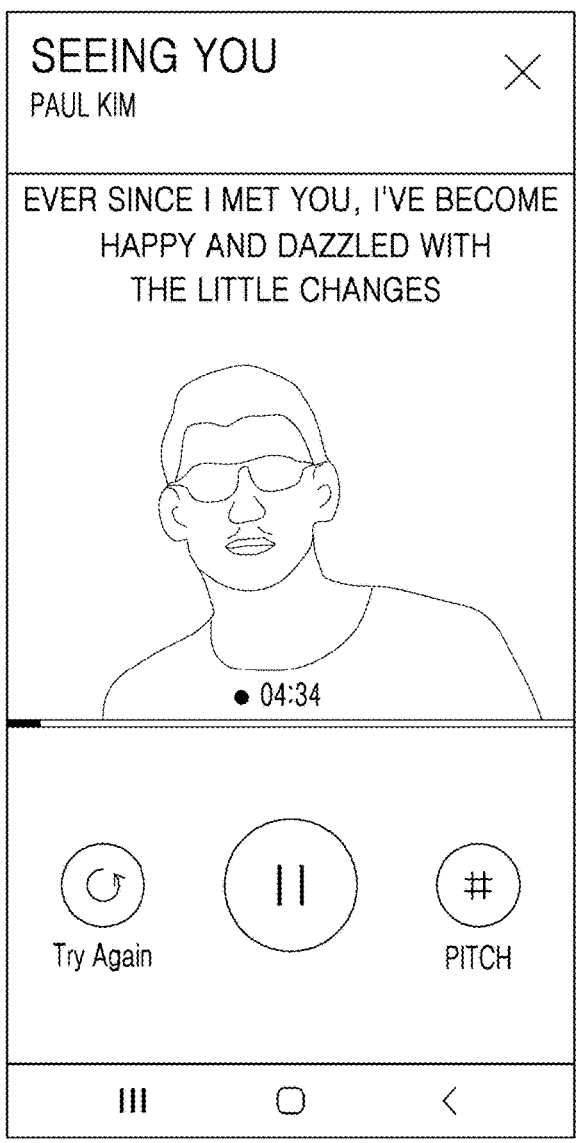

FIG. 5(B) is a screen of the user terminal when step S104 described above is performed. As shown in the drawing, the user may record a song while photographing an image of the user, but also may record only the song without photographing the image of the user.

FIG. 6 schematically shows an example of a screen displayed on a user terminal in the posting step according to one embodiment of the present invention.

FIG. 6(A) is a screen of the user terminal when step S106 is performed. As shown in the drawing, only when the user uses predetermined points, the corresponding song image may be stored in the server. Preferably, the points used to store the corresponding song image may be transferred to wallets of the system operating entity and the like.

Preferably, for storage using points, the application of the user terminal may request the user to enter a preset password, and the points may be used only when the user password entered in the user terminal is verified. Preferably, the input of password in the user terminal may be basically required for the use of points in the server system 1000.

FIG. 6(B) is a screen of the user terminal when step S108 is performed. The user may use points as a sponsorship (or deposit) for the song image of the user. In the above case, the application executed on the user terminal may also request the user to input a password, and posting the corresponding song and self-sponsoring (or deposit) may be performed according to the verification of the password inputted in the user terminal.

Figure 7:
FIG. 7 schematically shows an example of a screen to check a wallet in the user terminal according to one embodiment of the present invention.

FIG. 7 schematically shows an example of a screen to check a wallet in the user terminal according to one embodiment of the present invention.

As shown in FIG. 7, the user may check the total amount of points held by the user in the server system 1000, and the points used or acquired by the user, through the screen of the application.

Figure 8:
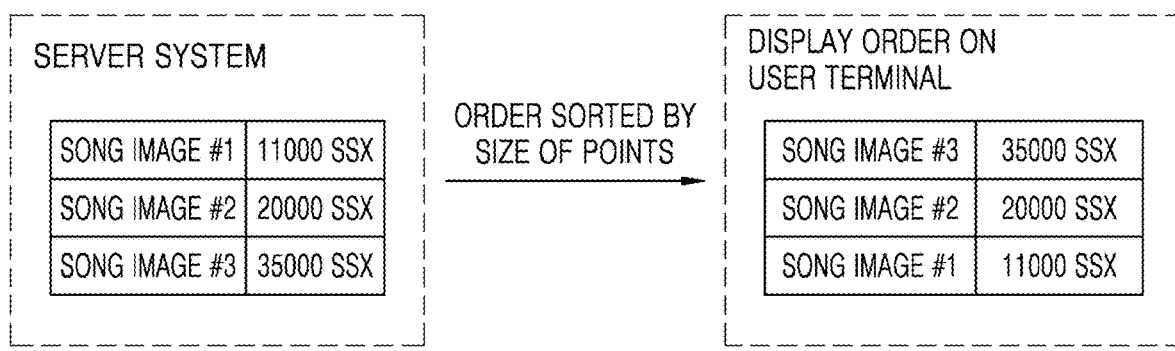
FIG. 8 schematically shows an example for explaining a sequence-sorting process of posted song images according to one embodiment of the present invention.

FIG. 8 schematically shows an example for explaining a sequence-sorting process of posted song images according to one embodiment of the present invention.

As shown in FIG. 8, the display order for the posted song images displayed by the user terminal in the server system 1000 is determined according to points accumulated in each song image.

Accordingly, the sponsorship of the sponsors in the first sponsorship step and the sponsorship of the song image provider in the posting step may be induced, and a song having high quality may obtain opportunities for more exposures and more sponsorships thereby.

Figure 9:
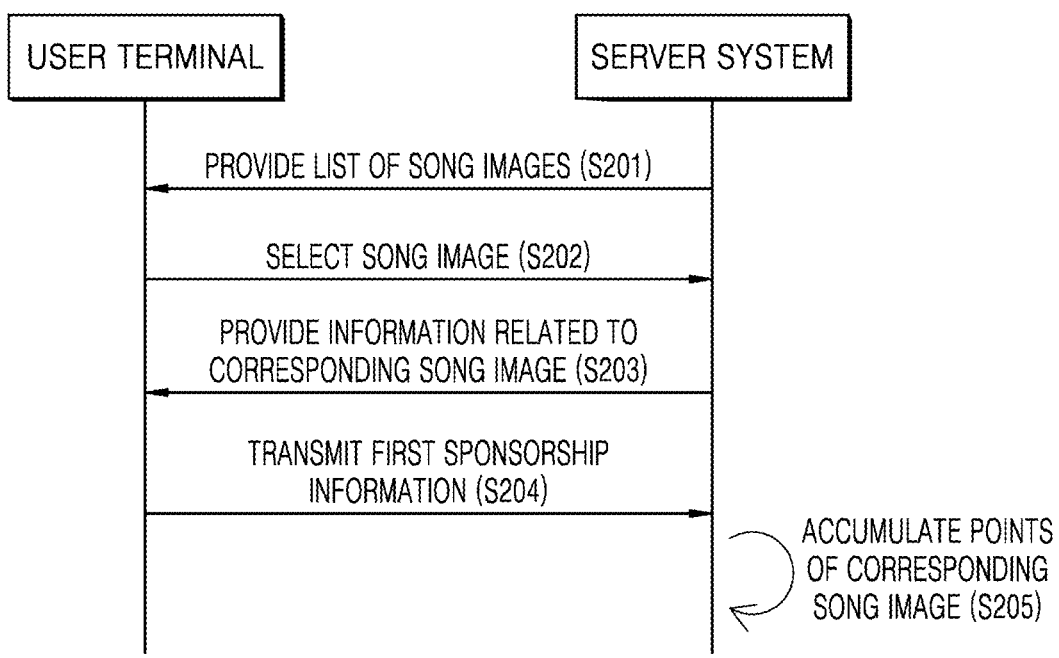
FIG. 9 schematically shows detailed steps of a first sponsorship step according to one embodiment of the present invention.

FIG. 9 schematically shows detailed steps of a first sponsorship step according to one embodiment of the present invention.

Step S201 includes performing providing a list of song images sequentially sorted according to sizes of the sponsorship points of each song image to the user terminal.

In step S202, a song image selection input of the user terminal is transmitted to the server system 1000, and step S203 includes performing a step of providing the corresponding song image to the user terminal.

In step S203, additional information about the corresponding song image, for example, points accumulated in the corresponding song image, comments on the corresponding song image, and the like may also be transmitted to the user terminal, and the user may check the additional information through the application.

In step S204, the server system 1000 receives the first sponsorship information according to an input of the user in the user terminal. The first sponsorship information includes information about points that the user wants to sponsor.

Step S205 includes performing accumulating sponsorship points for the corresponding song image based on the first sponsorship information.

Preferably, the sponsorship according to the first sponsorship information of the sponsor for the corresponding song image in the first sponsorship step may not be allowed to be withdrawn. This is because it is intended to perform the sponsorship and the distribution in the fairer manner, and to promote the trust of users who believe and sponsor the points of the current song image.

Figure 10:
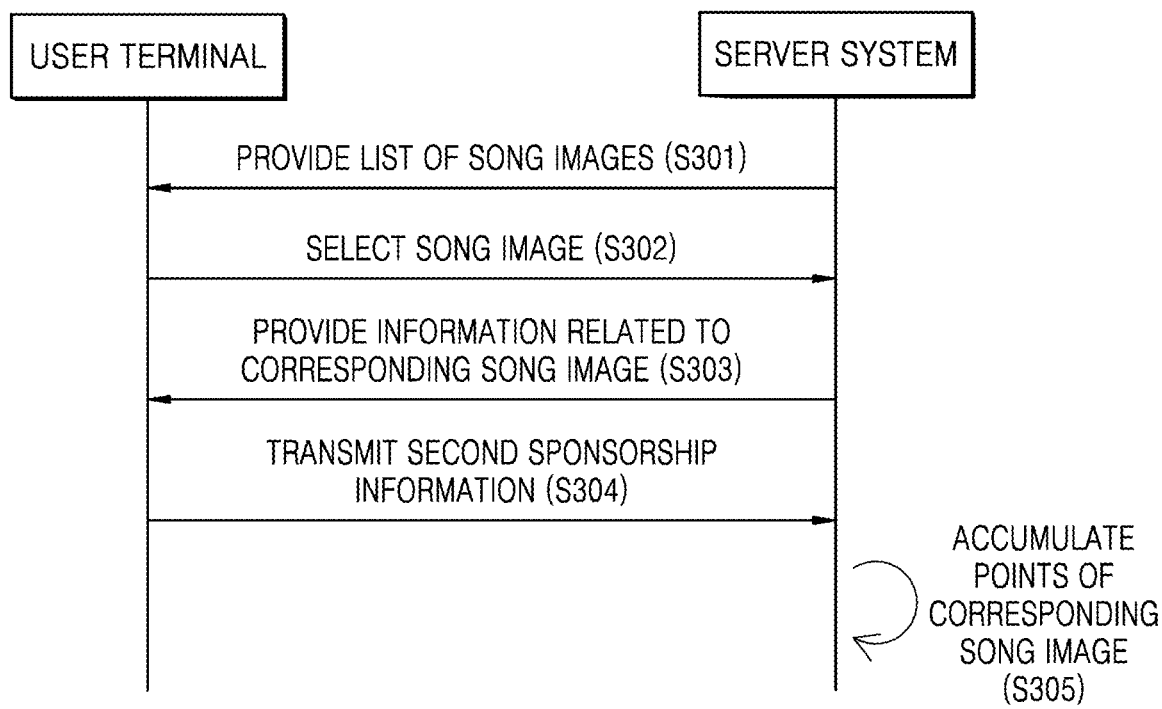
FIG. 10 schematically shows detailed steps of a second sponsorship step according to one embodiment of the present invention.

FIG. 10 schematically shows detailed steps of a second sponsorship step according to one embodiment of the present invention.

Step S301 includes performing providing a list of song images sequentially sorted according to sizes of the sponsorship points of each song image to the user terminal.

In step S302, a song image selection input of the user terminal is transmitted to the server system 1000, and step S303 includes performing a step of providing the corresponding song image to the user terminal.

In step S303, additional information about the corresponding song image, for example, points accumulated in the corresponding song image, comments on the corresponding song image, and the like may also be transmitted to the user terminal, and the user may check the additional information through the application.

In step S304, the server system 1000 receives the second sponsorship information according to an input of the user in the user terminal. The second sponsorship information includes information about points that the user wants to sponsor.

Step S305 includes performing accumulating sponsorship points for the corresponding song image based on the first sponsorship information.

FIG. 11 schematically shows a screen on the user terminal in some execution steps in the first sponsorship step and the second sponsorship step according to one embodiment of the present invention.

Figure 11A:
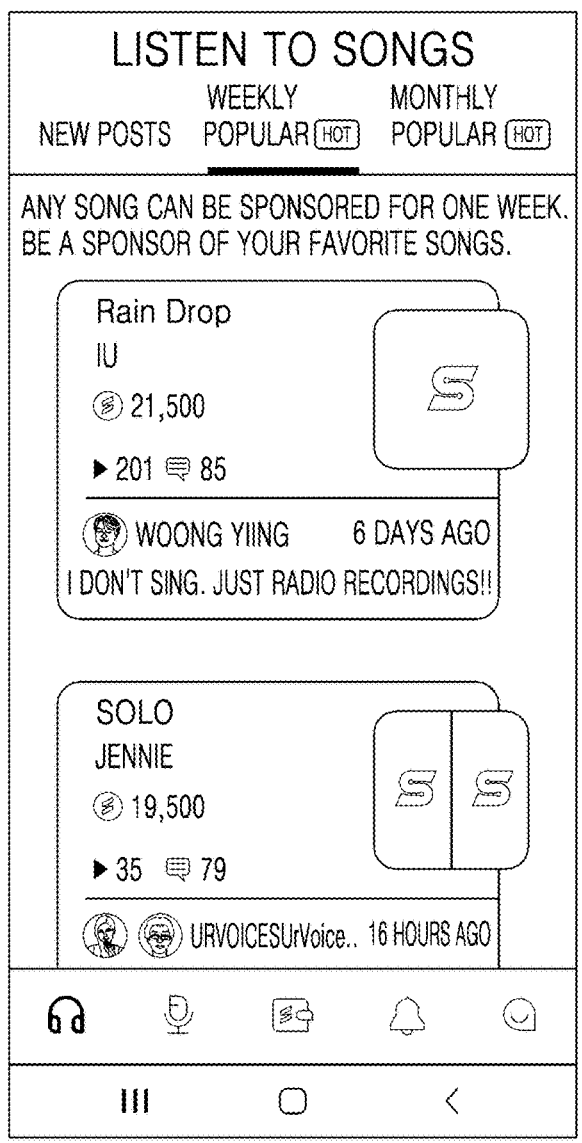
FIG. 11 schematically shows a screen on the user terminal in some execution steps in the first sponsorship step and the second sponsorship step according to one embodiment of the present invention.

FIG. 11(A) shows a screen in the user terminal related to the first sponsorship step.

As described above, the server system 1000 may provide a posted song image to the user, and song images proceeding in the first sponsorship step may be provided to the user terminal according to the category selection in the user terminal. FIG. 11(A) shows a selected "Weekly Popular" tab. The song images corresponding to the "Weekly Popular" tab correspond to the song images proceeding in the first sponsorship step.

As shown in FIG. 11(A), the song images are arranged in the order of accumulated points and displayed on the user terminal. In other words, the song image or identification information of the song image displayed at the first or at the top among a plurality of songs proceeding in the first sponsorship step at the current time period corresponds to the song image having the most points.

According to the above manner, the song image with higher points has the increased frequency of exposure to users.

Figure 11B:
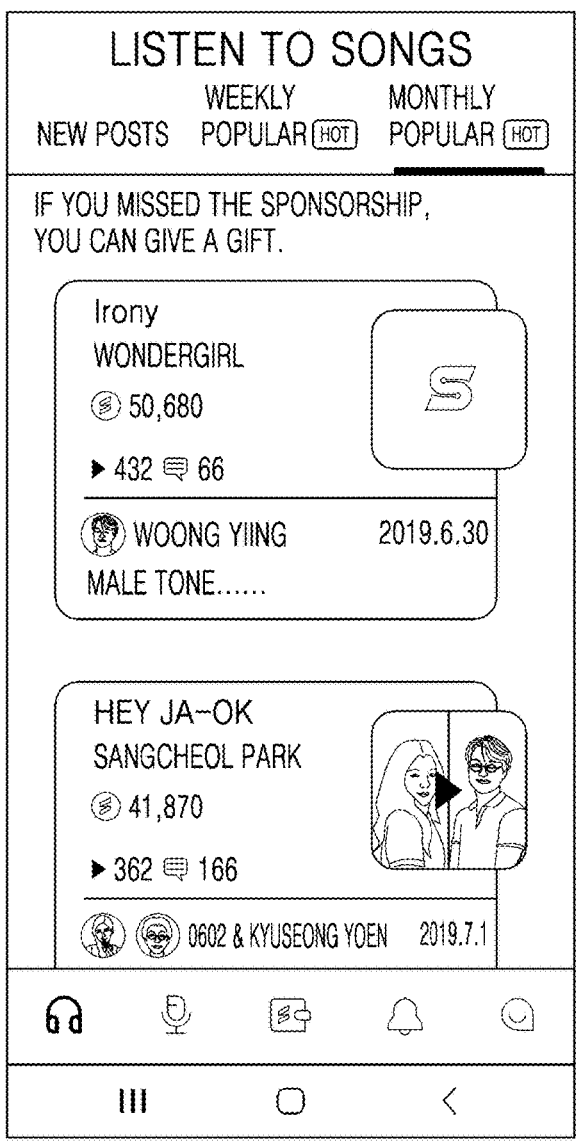

FIG. 11(B) shows a screen in the user terminal related to the second sponsorship step.

As described above, the server system 1000 may provide a posted song image to the user, and song images proceeding in the second sponsorship step may be provided to the user terminal according to the category selection in the user terminal. FIG. 11(B) shows a selected "Monthly Popular" tab. The song images corresponding to the "Monthly Popular" tab correspond to the song images proceeding in the second sponsorship step.

As shown in FIG. 11(B), the song images are arranged in the order of accumulated points and displayed on the user terminal. In other words, the song image or identification information of the song image displayed at the first or at the top among a plurality of songs proceeding in the second sponsorship step at the current time period corresponds to the song image having the most points.

According to the above manner, the song image with higher points has the increased frequency of exposure to users.

FIG. 12 schematically shows a screen on the user terminal in some execution steps in the first sponsorship step or the second sponsorship step according to one embodiment of the present invention.

Figure 12A:
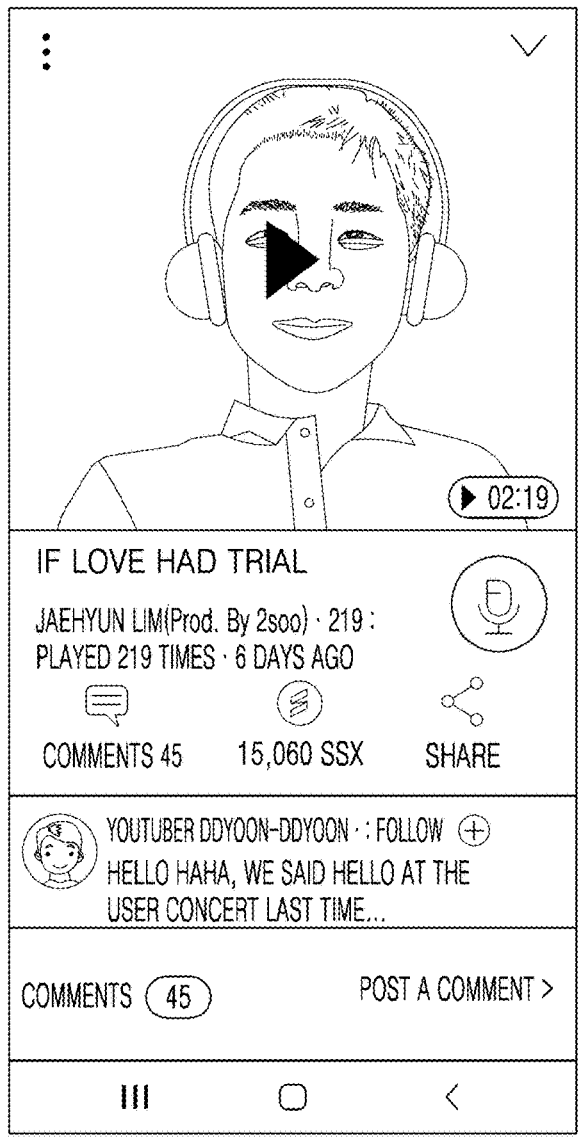
FIG. 12 schematically shows a screen on the user terminal in some execution steps in the first sponsorship step or the second sponsorship step according to one embodiment of the present invention.

Specifically, FIG. 12(A) is a screen displayed when a specific song image is selected in FIG. 11. FIG. 12(A) displays an image in the corresponding song image, a selection icon for performing recording on the song of the corresponding song image, comments, and holding points.

Figure 12B:
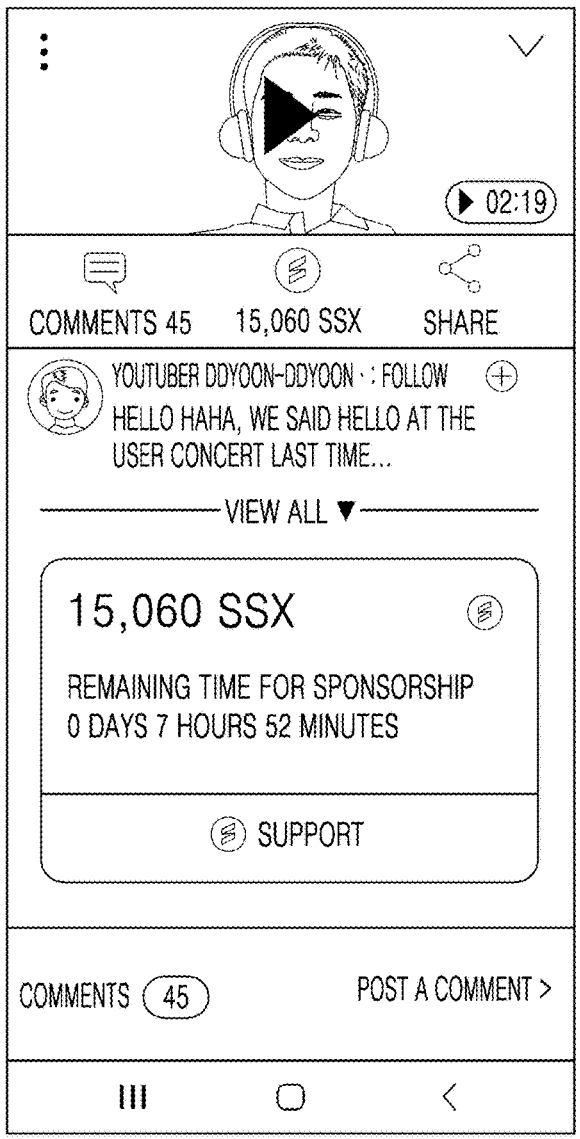

Meanwhile, FIG. 12(B) is a screen that displays the points currently held in the corresponding song image and a selection icon for inputting sponsorship therefor.

Figure 13:
FIG. 13 schematically shows a screen on the user terminal performing the sponsorship in the first sponsorship step or the second sponsorship step according to one embodiment of the present invention.

FIG. 13 schematically shows a screen on the user terminal performing the sponsorship in the first sponsorship step or the second sponsorship step according to one embodiment of the present invention.

FIG. 13 is a screen in the user terminal when the selection icon for inputting the sponsorship is selected in FIG. 12(B). Here, the user may enter the points that the user wants to sponsor and the password of the wallet, thereby using the points, so that the corresponding song image may be sponsored.

Figure 14:
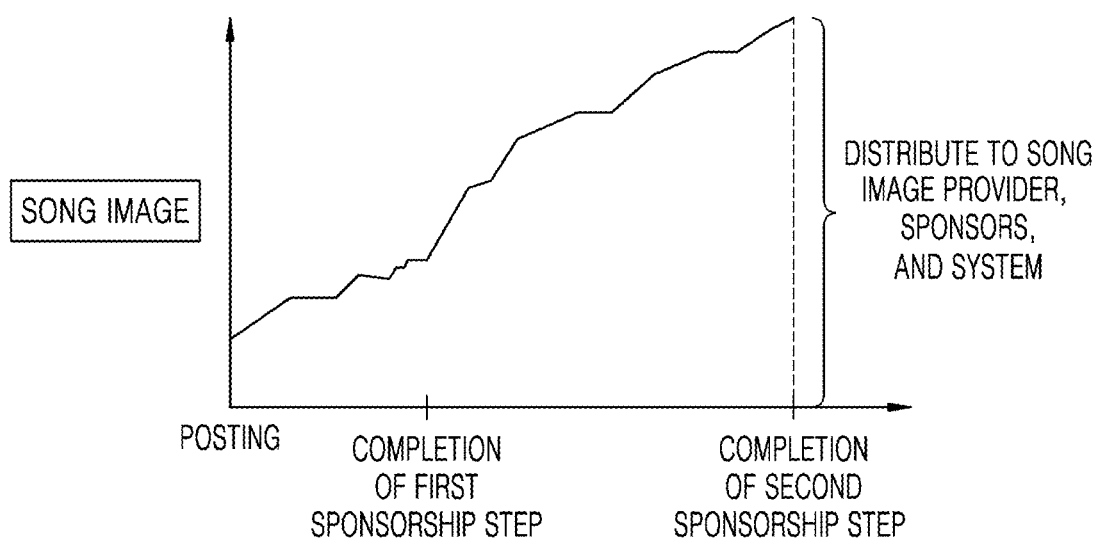
FIG. 14 schematically shows accumulation of points for the song image and distribution thereof in order to explain operations of a distributing unit according to one embodiment of the present invention.

FIG. 14 schematically shows the point accumulation and the distribution for the song image in order to explain operations of the distributing unit 1140 according to one embodiment of the present invention.

As shown in FIG. 14, the points for the song image may be continuously accumulated and increased after posting. Thereafter, after the period in the second sponsorship step has passed, the aforementioned distributing step is performed.

Preferably, in the distributing step, the distribution to the sponsors having performed the sponsorship in the first sponsorship step may be performed based on the sizes of sponsorship points of the sponsors in the first sponsorship step.

For example, when assumed that the total accumulated points is 100, of which 30 points are distributed to the sponsors in the first sponsorship step, and all sponsors in the first sponsorship step are sponsors A and B, in which sponsor A sponsors 2 points and sponsor B sponsors 1 point, sponsor A may receive 20 points, and sponsor B may receive 10 points.

In other words, in the distributing step, the distribution to the sponsors having performed the sponsorship in the first sponsorship step is performed by determining the distribution points in proportion to the sizes of sponsorship points of the sponsors in the first sponsorship step.

FIG. 15 schematically shows an internal configuration of the server system 1000 according to some embodiments of the present invention.

As described above, the server system 1000 may include one or more computing devices.

Figure 15A:
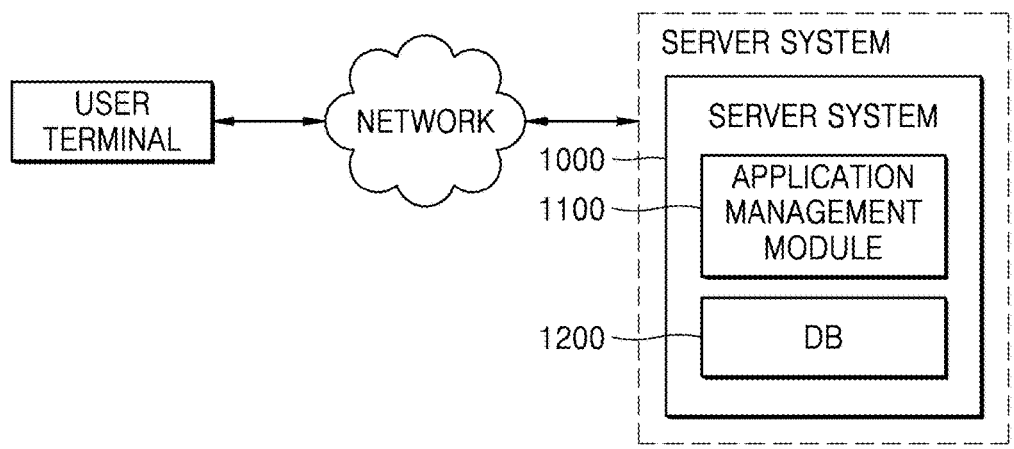
FIG. 15 schematically shows the internal configuration of the server system according to some embodiments of the present invention.

FIG. 15(A) is one embodiment of the server system 1000 composed of a service server including an application management module 1100 for performing data transmission/reception with the application and managing operations of the application, and a DB 1200 for storing song images, user information, point information, and the like. FIG. 15(A) shows that the server system 1000 is established using a server for managing general apps.

Figure 15B:
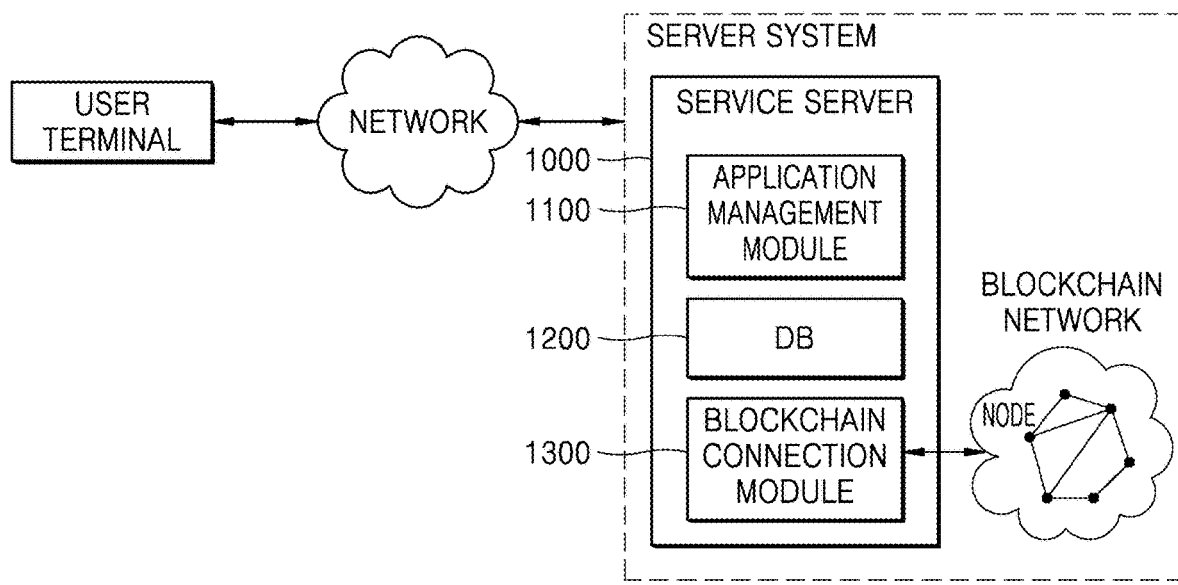

FIG. 15(B) shows the case in which the details of at least one among point-related creation, sponsorship, use, distribution, wallet-holding points, and the like are stored in the blockchain network.

In one embodiment of FIG. 15(B), the details of at least one among point-related creation, sponsorship, use, distribution, wallet-holding points, and the like are stored in the DB 1200 of the server system 1000 and in a block of the blockchain network, or the details of at least one among point-related creation, sponsorship, use, distribution, wallet-holding points, and the like are stored in the blockchain network.

In the embodiment of FIG. 15(B), the application of the user terminal basically performs data transmission and reception with the service server, the service server includes a blockchain connection module 1300 such as a daemon for each function, and the details related to the point are recorded in the block by the blockchain connection module 1300. This is to prevent forgery and falsification of the details related to points and ensure the authenticity.

FIG. 16 schematically shows an internal configuration of the server system 1000 according to some embodiments of the present invention.

Figure 16A:
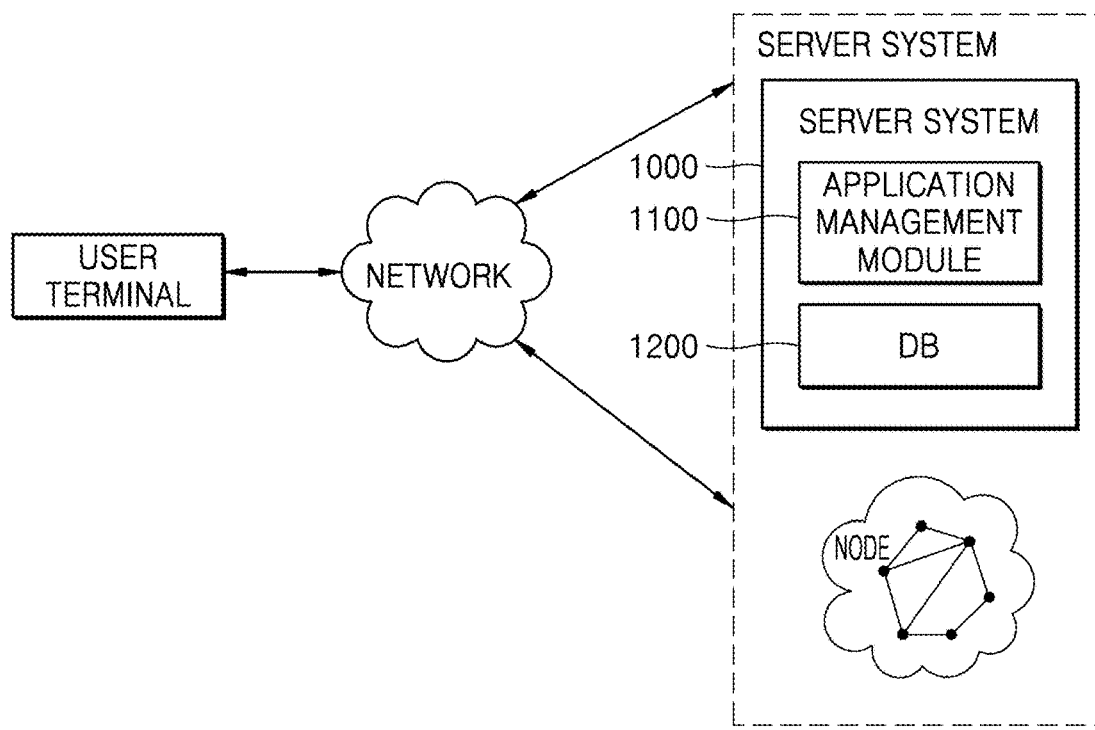
FIG. 16 schematically shows the internal configuration of the server system according to some embodiments of the present invention.

FIG. 16(A) shows the case in which the details of at least one among point-related creation, sponsorship, use, distribution, wallet-holding points, and the like are stored in the blockchain network.

In one embodiment of FIG. 16(A), the details of at least one among point-related creation, sponsorship, use, distribution, wallet-holding points, and the like are stored in the DB 1200 of the server system 1000 and in a block of the blockchain network, or the details of at least one among point-related creation, sponsorship, use, distribution, wallet-holding points, and the like are stored in the blockchain network.

In the embodiment of FIG. 16(A), the application of the user terminal performs data transmission and reception with the service server and blockchain network (node), and the point-related details are recorded directly on the blockchain network without passing through the service server.

Figure 16B:
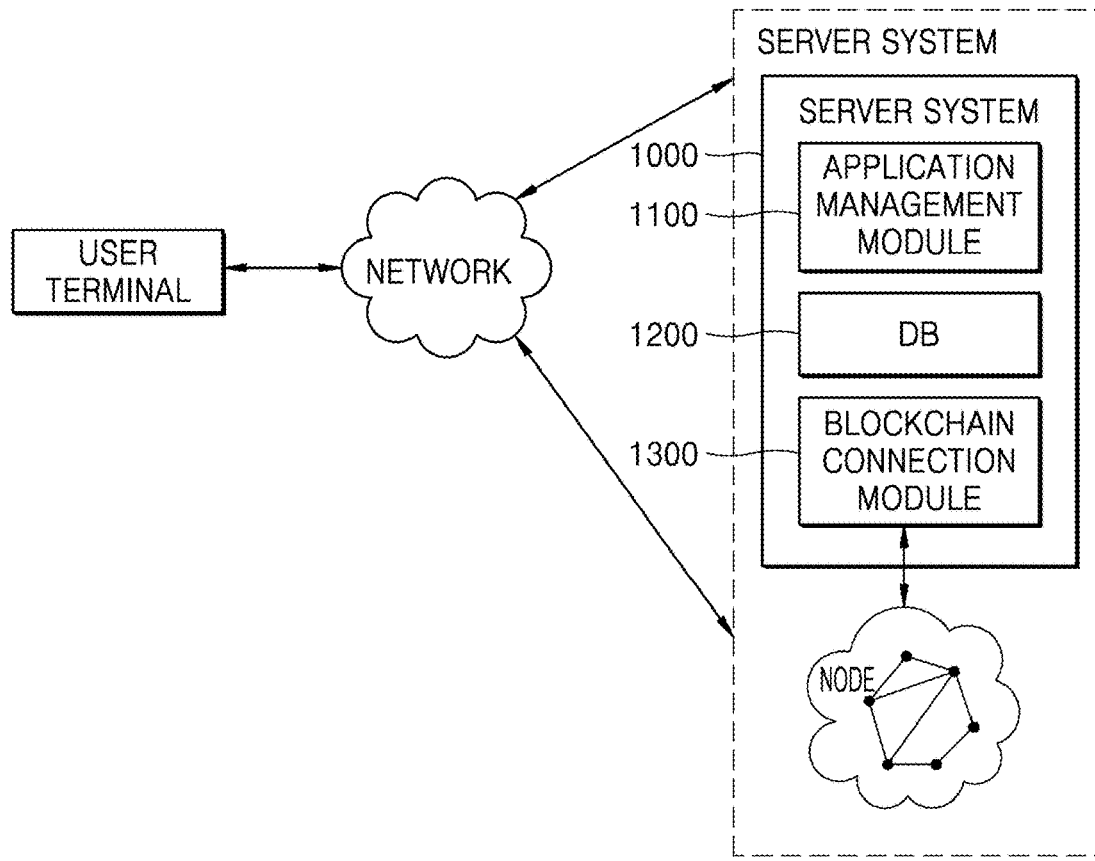

Meanwhile, FIG. 16(B) shows the embodiment in which the service server includes a blockchain connection module 1300 such as a daemon for each function, and in some cases, the point-related details are recorded in the block by the blockchain connection module 1300, and in some cases, the data transmission and reception with the blockchain network is performed directly from the user terminal.

The server system 1000 as described with reference to FIGS. 15 and 16 corresponds to the embodiments of the present invention, and the server system 1000 may be implemented in other ways.

FIG. 17 schematically shows the configuration of a module for performing the detailed steps of the method for distributing the points in the karaoke application shown in FIG. 2 according to some embodiments of the present invention.

The posting step, the first sponsorship step, the second sponsorship step, and the distributing step described with reference to FIG. 2 may be implemented by the system for distributing points in a karaoke application implemented by one or more computing devices including one or more processors and one or more memories, and the above system may correspond to the above-described server system 1000.

The above server system 1000 may include: a posting unit 1110 for performing a posting to allow a third user to view a song image received from a user terminal of a song image provider who wants to post the song image; a first sponsorship unit 1120 for providing the posted song image to a user terminal of the third user during a predetermined first period, receiving first sponsorship information including information about points to be sponsored from a user terminal of a sponsor who wants to sponsor the corresponding song image, and accumulating the points for the corresponding song image; a second sponsorship unit 1130 for providing the posted song image to a user terminal of a third user during a predetermined second period after the first period, receiving second sponsorship information including information about points to be sponsored from a user terminal of a sponsor who wants to sponsor the corresponding song image, and accumulating the points for the corresponding song image; and a distributing unit 1140 for distributing the accumulated points for the corresponding song image to the user having posted the corresponding song image and the user having sponsored during the first period.

The posting unit 1110, the first sponsorship unit 1120, the second sponsorship unit 1130, and the distributing unit 1140 may be implemented within a single computing device or may be implemented by a plurality of computing devices. In one embodiment, some of the posting unit 1110, the first sponsorship unit 1120, the second sponsorship unit 1130, and the distributing unit 1140 also may be implemented in other physically separate computing devices. In one embodiment, each of the one or more elements, among the posting unit 1110, the first sponsorship unit 1120, the second sponsorship unit 1130, and the distributing unit 1140, may be implemented in a plurality of computing devices. For example, some of the distributing step may be performed in the service server, and the rest may be performed in the blockchain network.

Figure 17A:
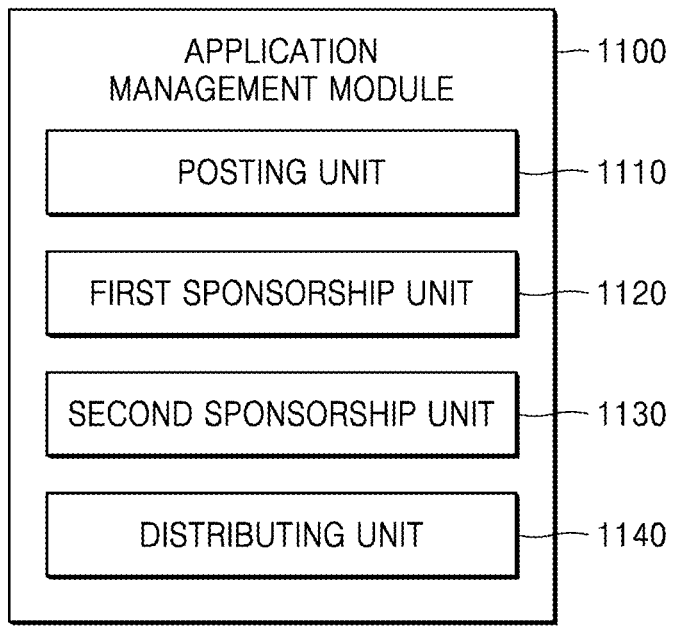
FIG. 17 schematically shows the configuration of a module for performing the detailed steps of the method for distributing the points in the karaoke application shown in FIG. 2 according to some embodiments of the present invention.

FIG. 17(A) shows that the posting unit 1110, the first sponsorship unit 1120, the second sponsorship unit 1130, and the distributing unit 1140 are included in the application management module of one service server.

Figure 17B:
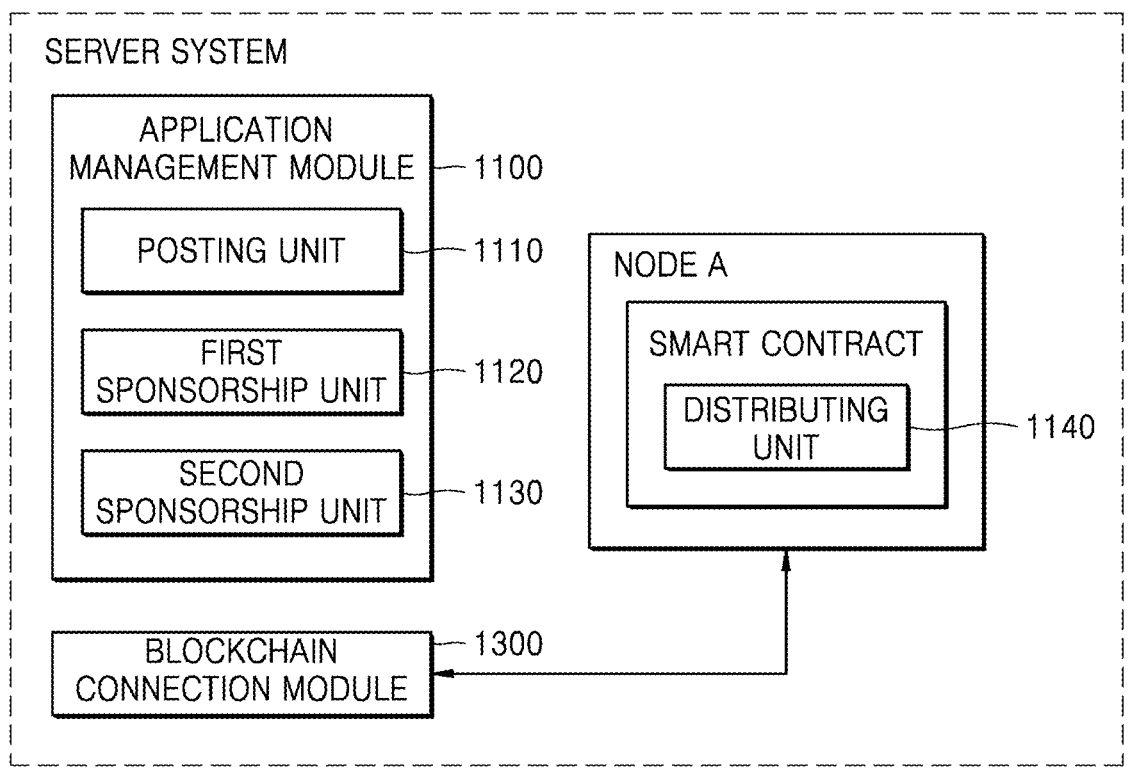

FIG. 17(B) shows the case in which some of the posting unit 1110, the first sponsorship unit 1120, the second sponsorship unit 1130, and the distributing unit 1140, for example, the distributing unit 1140 is performed as a part of a smart contract of the blockchain network. As another modification of FIG. 17(B), the above-mentioned distributing step may be implemented by the blockchain connection module 1300 and a part of the smart contract, or the above-mentioned distributing step may be implemented by a part of the application management module 1100, the blockchain connection module 1300, and a part of the smart contract.

The performing form in the server system 1000 for the above-described posting step, first sponsorship step, second sponsorship step, and distributing step merely corresponds to the embodiments of the present invention, and the scope of the present invention is not limited thereto. The posting step, the first sponsorship step, the second sponsorship step, and the distributing step according to the embodiments of the present invention may be implemented by combining various computing devices and/or applying the blockchain network.

The operations of the karaoke application and the point distribution in the karaoke application have been described with reference to FIGS. 1 to 17. As described above, the point management in the server system according to the operations of the karaoke application may be performed by the service server. In order to manage strict guarantees to users for more fair and transparent management and distribution with respect to points, the embodiments described with reference to FIGS. 15 to 17 include the configuration of recording the details about points by using the blockchain network.

Hereinafter, more specifically, the embodiments will be described in which the details according to the operations of the karaoke application and server system are recorded in the blockchain network, and accordingly, transparent and fair management for the point transfer and distribution is carried out, so that users may be induced to participate in the karaoke application, and the value of point itself may be increased.

The method and the system for managing points in the karaoke application by using the blockchain network described below may be used to implement the operation and/or the point distribution of the karaoke application described with reference to FIGS. 1 to 17, and specifically, may also be applied to the management of points according to operations of another type of karaoke application.

Hereinafter, the description related to the karaoke application and the point distribution method described in FIGS. 1 to 17 will be partially omitted. Meanwhile, in the configuration of the system, the description of some configurations related to the karaoke application in FIGS. 1 to 17 may be omitted. Hereinafter, the embodiments of the present invention will be described focusing on the configuration of point management using the blockchain network.

Figure 18:
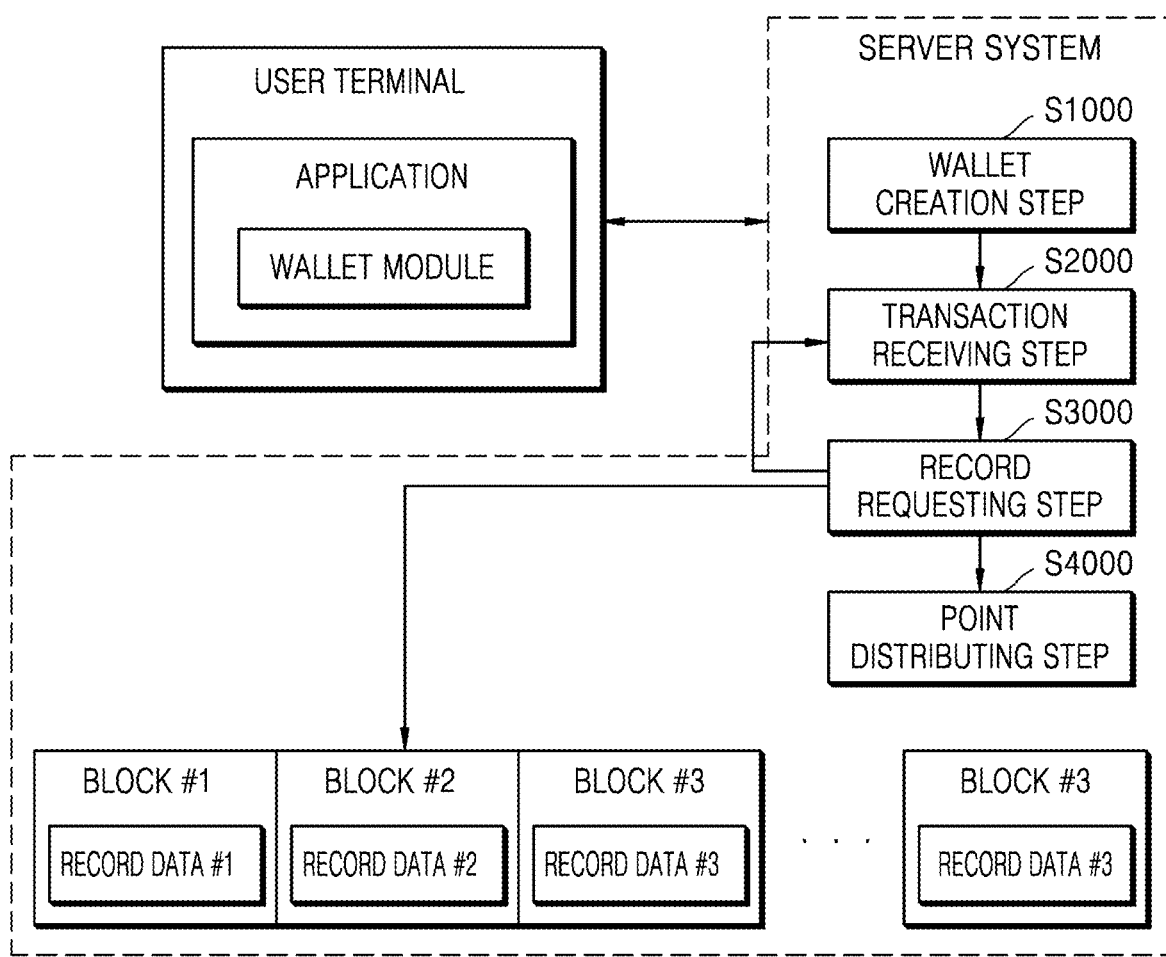
FIG. 18 schematically shows major steps of the method for managing the points in the karaoke application by using a blockchain network according to one embodiment of the present invention.

FIG. 18 schematically shows major steps of the method for managing the points in the karaoke application by using a blockchain network according to one embodiment of the present invention.

The method for managing points in the karaoke application by using the blockchain network according to one embodiment of the present invention is performed in the server system.

According to one embodiment of the present invention, the server system may include a service server 1000, and a blockchain network, and a blockchain connection module 1300 implemented as a computing device subordinate in or independent from the service server 1000 (configuration to connect to nodes of the blockchain network). Meanwhile, the server system may include only some nodes of the blockchain network, not including all nodes of the blockchain network. Alternatively according to one embodiment of the present invention, the server system may include only the service server 1000 and the blockchain connection module 1300.

In the karaoke application, the user may post a song image of the user or may sponsor a song image of another user. FIGS. 1 to 14 show the embodiments thereof.

Meanwhile, information about points held for each user's wallet and information about points held for each wallet of the posted song images are recorded in the blockchain network. Preferably, information about one or more wallets related to the system operating entity is recorded in the blockchain network. The status of the above wallet may be in the form described with reference to FIG. 3.

The users, the song images, and the system operating entity may hold points of their own through wallets, and information about holding points may be directly or indirectly recorded in the blocks of the blockchain network. According to one embodiment of the present invention, the total amount of the holding points may be recorded for the wallets, respectively, in the blocks of the blockchain network, however, transaction information such as information about a sending wallet, a receiving wallet, and transferred points may be recorded in the blocks of the blockchain network, and the total holding points of each wallet may be calculated based on the above transaction information.

Meanwhile, the application is executed on the user terminal, and the user terminal may preferably include a wallet module. According to one embodiment of the present invention, the wallet module or the like of the application inside the user terminal may determine whether the user is an authorized user based on information entered by the user. After determining whether the user is the authorized user, a partial data transfer or request from the user terminal to the server system (for example, a request to transfer points from a wallet of the user to another wallet) may be performed.

According to one embodiment of the present invention, a private key for validly recording and/or verifying transactions in the blockchain network of the server system is stored in the user terminal while being encrypted form. When unique information (such as password) is entered in the user terminal, the private key is decrypted according to the unique information. After determining whether the decrypted private key matches the private key stored in the user terminal, a partial data transfer or request from the user terminal to the server system (for example, a request to transfer points from a wallet of the user to another wallet) may be performed by the application.

Various details related to the operations of the karaoke application or corresponding points may be recorded in the blocks of the blockchain network. Hereinafter, a managing process on the blockchain network for the creation of wallets, the transfer of points through the aforementioned postings, sponsorships, and the like, and the distribution after completion of the sponsorships will be described.

Step S1000 includes performing a wallet creation step of creating a new wallet when a new user joins for one or more nodes of the blockchain network, requesting private key information for the new wallet, and transmitting the private key information for the new wallet received from the one or more nodes to a user terminal.

The above wallet creation step may be performed when the user joins, or a wallet for the corresponding song image may be created when the user posts a song image. In this case, it may be preferable that the private key for the song image is not transmitted to the user. According to another embodiment of the present invention, in regard to the creation of a wallet for the song image, the user may request the song image posting to the server system through the application, and the server system may perform the creation of the corresponding wallet in the record requesting step S3000 therefor.

Step S2000 includes performing a transaction receiving step in which information about a transaction requesting a point transfer from a wallet of a specific user to a wallet of a specific song image is received directly or indirectly from a karaoke application performed on a user terminal.

Preferably, the information about the transaction received in the transaction receiving step may include information about transaction confirmed and transmitted for the private key inside the user terminal, or include information about a transaction confirmed for the private key inside the user terminal, and generated based on the information transmitted to the server system.

The information about the transaction includes information about transfers of points from a specific wallet to another wallet due to postings, sponsorships, and the like of karaoke applications.

The information about the transaction basically includes information about the sending wallet for points, information about the receiving wallet, and information about the transferring points.

Step S3000 includes performing a record requesting step of requesting one or more nodes of the blockchain network to perform recording in a block of the blockchain network based on the information about the transaction.

In other words, the details of points according to operations such as posting, sponsoring, and the like for the corresponding song image are recorded in the blockchain network in step S3000.

Various known methods may be applied to data validation, block generation, consensus, and propagation within the blockchain network. Transactions according to the use of the karaoke application may be recorded in the recorded data of the blocks stored in a distributed manner by the operations of the nodes constituting the blockchain network through the record requesting step, and new blocks may be generated and stored in nodes on the blockchain network as the amount of data is increased.

Step S4000 includes performing a point distributing step of transferring a part of the points held in the wallet of the corresponding song image to wallets of some of users sponsoring the corresponding song image and a wallet of a user providing the corresponding song image, after expiration of the predetermined sponsorship period for the corresponding song image set in the server system.

The above point distributing step may be implemented in the cases in which a configuration outside the blockchain network, such as the blockchain connection module 1300, requests execution of a smart contract related to nodes constituting one or more blockchain networks, and the node executes a smart contract related to the corresponding point distribution, or the node checks time information on the blockchain network and automatically executes the smart contract related to the point distribution.

According to one embodiment of the present invention, the service server 1000 or the blockchain connection module 1300 outside the node confirms the expiration of the second sponsorship period for the corresponding song image. Accordingly, the blockchain connection module 1300 requests the smart contract module included in the blockchain network to distribute the points related to the corresponding song image, and the smart contract module executes the corresponding distribution and records corresponding transfers of the points in the blocks.

Accordingly, the wallet creation according to the operation of the karaoke application on the user terminal and the recording of the transaction in the blocks of the blockchain network are performed in the server system.

Figure 19:
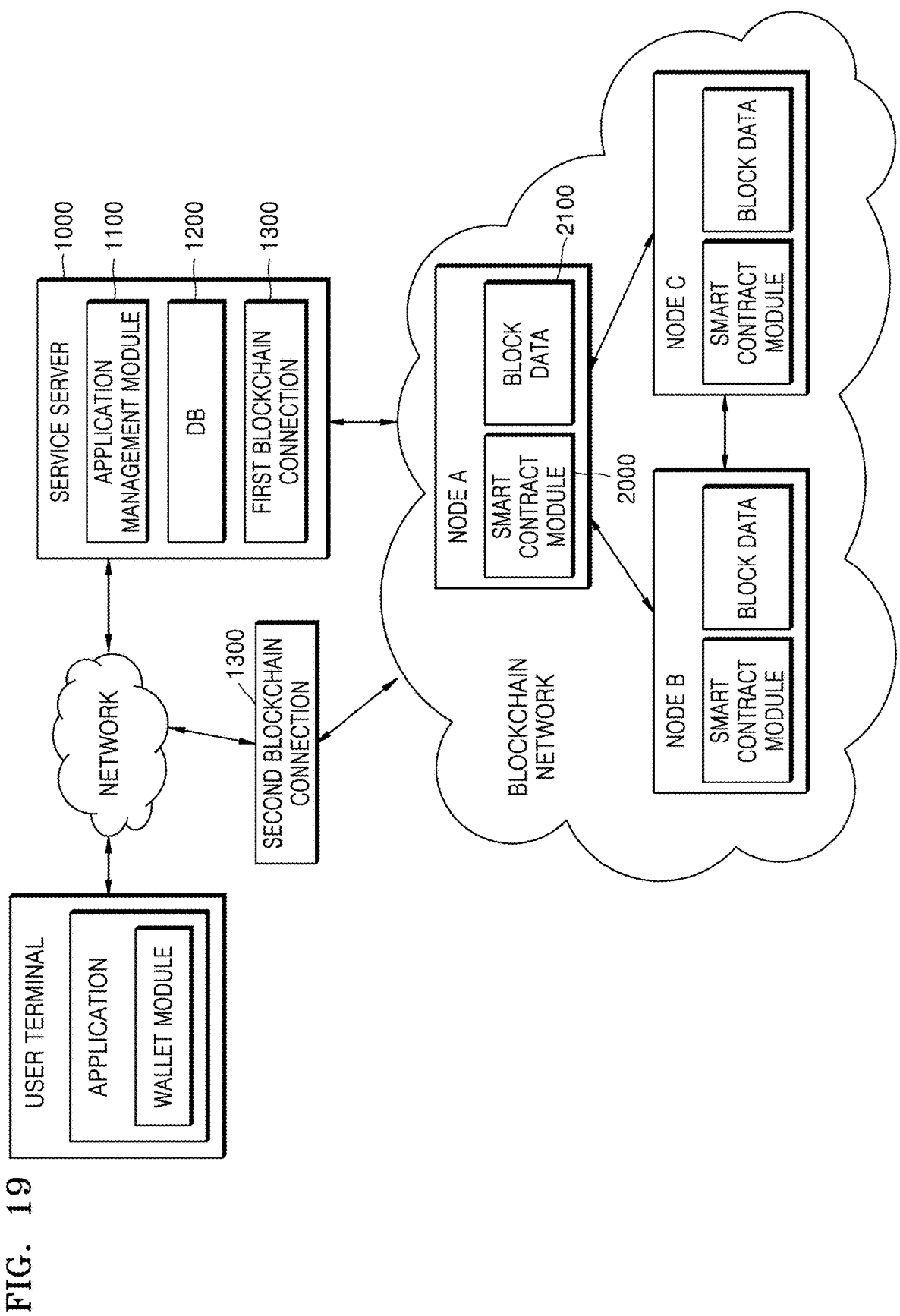
FIG. 19 schematically shows overall components in the karaoke application by using the blockchain network according to one embodiment of the present invention.

FIG. 19 schematically shows overall components in the karaoke application by using the blockchain network according to one embodiment of the present invention.

The karaoke application is installed on the user terminal, and the wallet module for accessing the karaoke application and/or verifying the information related to transfers of points and/or the private key is included in the user terminal.

According to one embodiment of the present invention, the wallet module may include a module for decrypting the above-described private key information and the encrypted private key by using an inputted decryption key, and a module for confirming whether the decrypted private key matches the stored private key information. Preferably, the wallet module may further include a module for digitally signing the request related to the point transfers transmitted from the user terminal.

The service server 1000 includes an application management module 1100, and a DB 1200. The application management module 1100 refers to a module for enabling the user to use the karaoke application in the user terminal by performing data transmission/reception with the application executed in the user terminal. According to one embodiment of the present invention, the DB 1200 may store song images, comments, and the like. According to one embodiment of the present invention, the DB 1200 may additionally store wallet addresses for each account. According to one embodiment of the present invention, the current or past point holding details of a wallet derived from the blocks of the blockchain network may be stored.

According to one embodiment of the present invention, the service server 1000 may include a first blockchain connection module 1300, wherein the first blockchain connection module 1300 requests the node to record the wallet creation, the point transfer and the like in the blocks through data communication with the nodes of the blockchain network. The above first blockchain connection module 1300 may be implemented in the same hardware configuration as the application management module 1100 or the like of the service server 1000, but may be implemented in a hardware configuration physically different from other components of the service server 1000.

In another embodiment of the present invention, the service server 1000 may not include the first blockchain connection module 1300, and the server system may include a second blockchain connection module 1300 that the user terminal can directly access. In the above case, the use in the application, such as viewing a song image or simple receiving and recording of a song sound source, may be conducted by the application management module 1100 of the service server 1000, however, the wallet creation, the point transfer, the point inquiry and the like may be performed by the second blockchain connection module 1300.

In another embodiment of the present invention, the server system may be implemented in the form of including both of the first blockchain connection module 1300 and the second blockchain connection module 1300.

The blockchain network includes a plurality of nodes. The nodes may store block data with distribution or share, and may include a smart contract module 2000 that performs a function such as recording requested by the blockchain connection module 1300.

According to one embodiment of the present invention, any one of the nodes may be implemented in the form of executing a specific function in the smart contract module and propagating the executing result to the other nodes.

Alternatively according to one embodiment of the present invention, a plurality of nodes may perform distributed computing operations, so that the specific function of the smart contract module may be performed.

Alternatively according to one embodiment of the present invention, codes of the smart contract module are distributed and stored in each node, and the distributed computing operation is performed in the nodes when the specific function of the smart contract module is called by the blockchain connection module 1300, so that the specific function of the smart contract module may be performed.

The server system according to one embodiment of the present invention basically includes the service server 1000 and the blockchain connection module 1300. Alternatively the server system according to one embodiment of the present invention may further include one or more nodes in the blockchain network.

Figure 20:
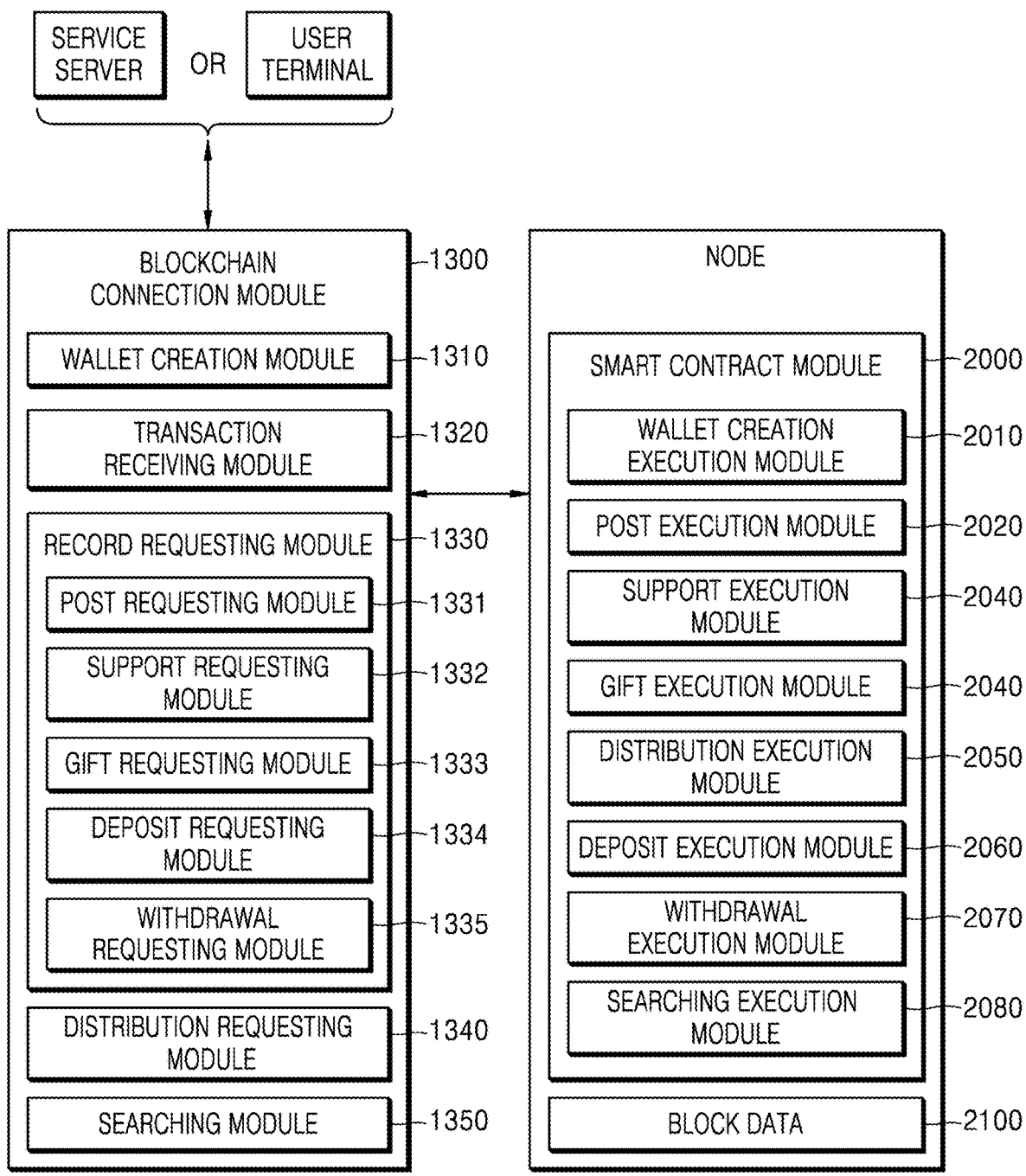
FIG. 20 schematically shows internal configurations of a blockchain connection module and a node according to one embodiment of the present invention.

FIG. 20 schematically shows internal configurations of the blockchain connection module 1300 and the node according to one embodiment of the present invention.

The blockchain connection module 1300 may perform data communication directly or indirectly with the service server 1000 or the user terminal.

The blockchain connection module 1300 may include a wallet creation module 1310 that performs the wallet creation step, a transaction receiving module 1320 that performs the transaction receiving step, a record requesting module 1330 that performs the record requesting step, a distribution request module 1340 that performs the point distributing step, and an inquiry module 1350 that inquires details related to points and/or wallets recorded in the blocks of the blockchain network.

The wallet creation module 1310 creates a new wallet when a new user joins for one or more nodes of the blockchain network, requests private key information for the new wallet, and transmits the private key information for the new wallet received from the one or more nodes to the user terminal.

In addition, the wallet creation module 1310 may transmit a part of information about the created wallet to the service server 1000 or perform management of the wallet. The wallet creation module 1310 may be operated according to a call of a detailed module of the record requesting module.

The transaction receiving module 1320 directly or indirectly receives information about a transaction requesting a point transfer from a wallet of a specific user to a wallet of a specific song image from the karaoke application performed on the user terminal.

Various types of transactions may be recorded in the blocks implemented as block data of the nodes, however, hereinafter, the transactions will be described focusing on transactions related to posting, sponsorship, and distribution of song images.

The transaction receiving module 1320 may directly receive information about the transaction from the application executed on the user terminal, or may receive the information about the transaction from the service server 1000 after the information about the transaction is inputted to the service server 1000 from the application executed in the user terminal.

The record requesting module 1330 requests one or more nodes of the blockchain network to perform recording in the block in the blockchain network based on the information about the transaction. The recording in the block is subject to the point transfer such as posting and sponsoring in the karaoke application.

According to one embodiment of the present invention, the record requesting module 1330 may include: a posting request module 1331 that requests reflection or recording in the blocks for point transfer related to the posting step S100 (or more specifically, step S108 of FIG. 4) of FIG. 2 described above; a support requesting module 1332 that requests reflection or recording in the block for point transfer related to the first sponsorship step S200; and a gift requesting module 1333 that requests reflection or recording in the block for point transfer related to the second sponsorship step S300.

According to one embodiment of the present invention, as in step S106 in FIG. 4 described above, the record requesting module 1330 includes a deposit requesting module 1334 that requests reflection or recording in the block for the point transfer related to the storage of the song image in the server system, and a withdrawal requesting module 1335 that requests reflection or recording in the block for the point transfer related to deletion of the stored song image or withdrawal of the corresponding user.

After expiration of the predetermined sponsorship period for the corresponding song image set in the server system, the distribution requesting module 1340 requests recording and reflection in the block related to the point distributing step of transferring a part of the points held in the wallet of the corresponding song image to wallets of some of users sponsoring the corresponding song image and a wallet of a user providing the corresponding song image.

The node may include a smart contract module 2000 and block data 2100, and the smart contract module 2000 may include a wallet creation execution module 2010, a posting execution module 2020, a support execution module 2030, a gift execution module 2040, a distribution execution module 2050, a deposit execution module 2060, a withdrawal execution module 2070, and an inquiry execution module 2080 so as to perform recording, reflection and the like in the block requested by the detailed module of the blockchain connection module 1300.

In other words, the nodes of the blockchain network includes the smart contract module 2000. In particular, in the case of the point distributing step S4000, it is preferable that the transfer of a part of the points held in the wallet of the corresponding song image to wallets of some of users sponsoring the corresponding song image and a wallet of a user providing the corresponding song image may be recorded in the blockchain network by the smart contract module 2000, after expiration of the predetermined sponsorship period for the corresponding song image set in the server system, in order to further ensure fairness and certainty of executing the distribution.

In addition, when the point transfer details and the like in the karaoke application is stored only in the service server 1000, intentional forgery or hacking may occur in point-related holding details, sponsoring details, distributing details, or the like, so there may be limits in the value as the goods based on the credibility of the points. However, according to the present invention, the information about point details according to the use of the karaoke application is recorded in the block of the blockchain network, so that the credibility of the points may be facilitated, as a result, the monetary value of the points is promoted, and the exchange value with other external goods may be increased.

Figure 21:
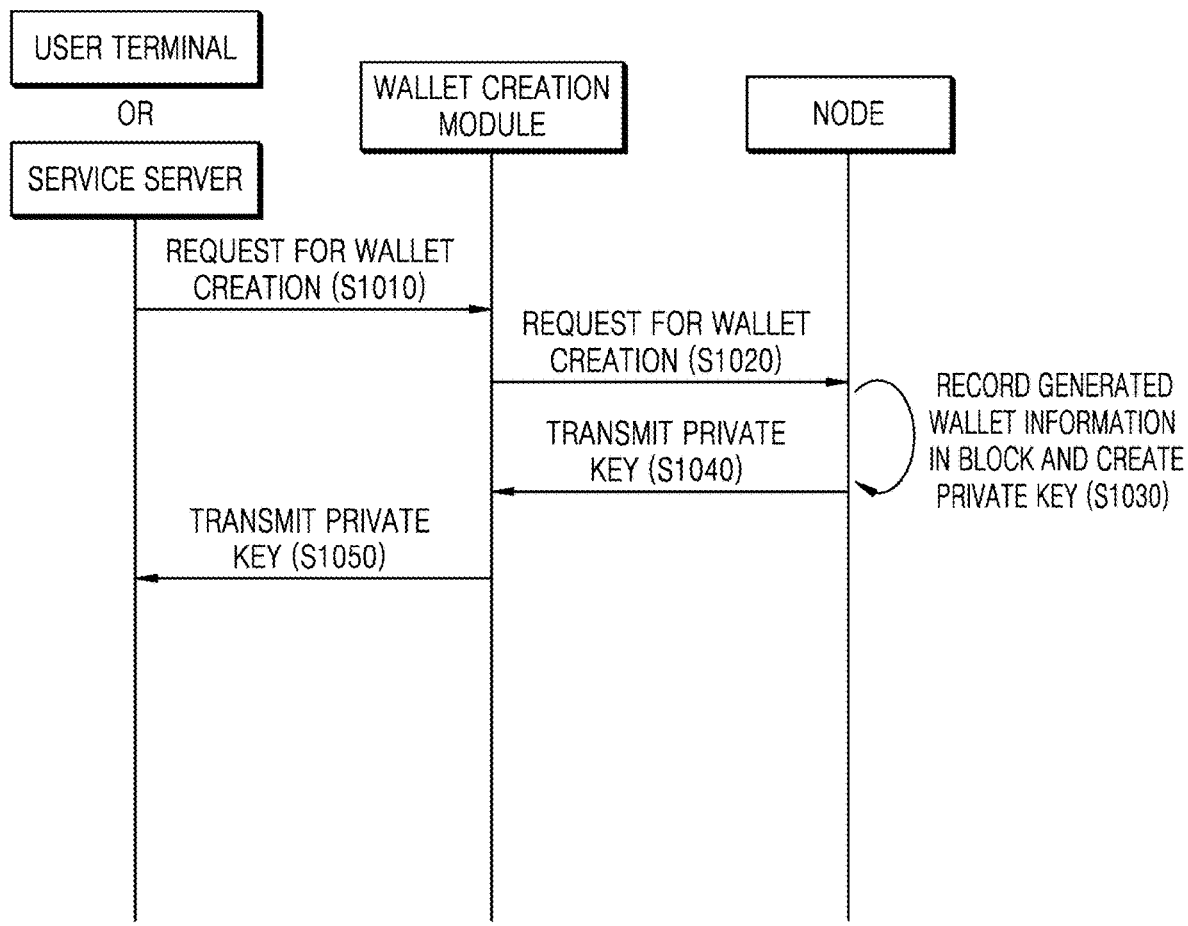
FIG. 21 schematically shows detailed steps of a wallet creation step according to one embodiment of the present invention.

FIG. 21 schematically shows detailed steps of a wallet creation step according to one embodiment of the present invention.

According to one embodiment of the present invention, when the joining the service server 1000 is conducted according to the input of the application in the user terminal, the service server 1000 requests the wallet creation module to create a wallet in step S1010, and the wallet creation module requests a connected node to create the wallet in step S1020.

Thereafter, in step S1030, the smart contract module of the node creates the wallet, records corresponding information in the block, generates a private key related to the corresponding wallet, and transmits the private key to the wallet module of the user terminal through steps S1040 and S1050, and the wallet module of the user terminal stores the received private key.

The private key stored in the above manner may be used for user verification and digital signature of data transmitted to the block in a transaction request related to points thereafter.

Preferably, in step S1040, the address of the created wallet, for example, the public key for the private key may be transmitted to the wallet creation module, and the service server 1000 may match and store the corresponding public key and owner information of the corresponding wallet (for example, ID or email address of the owner).

In other words, the wallet creation module performs steps of creating a new wallet when a new user joins for one or more nodes of the blockchain network, requesting private key information for the new wallet, and transmitting the private key information for the new wallet received from the one or more nodes to the user terminal.

Figure 22:
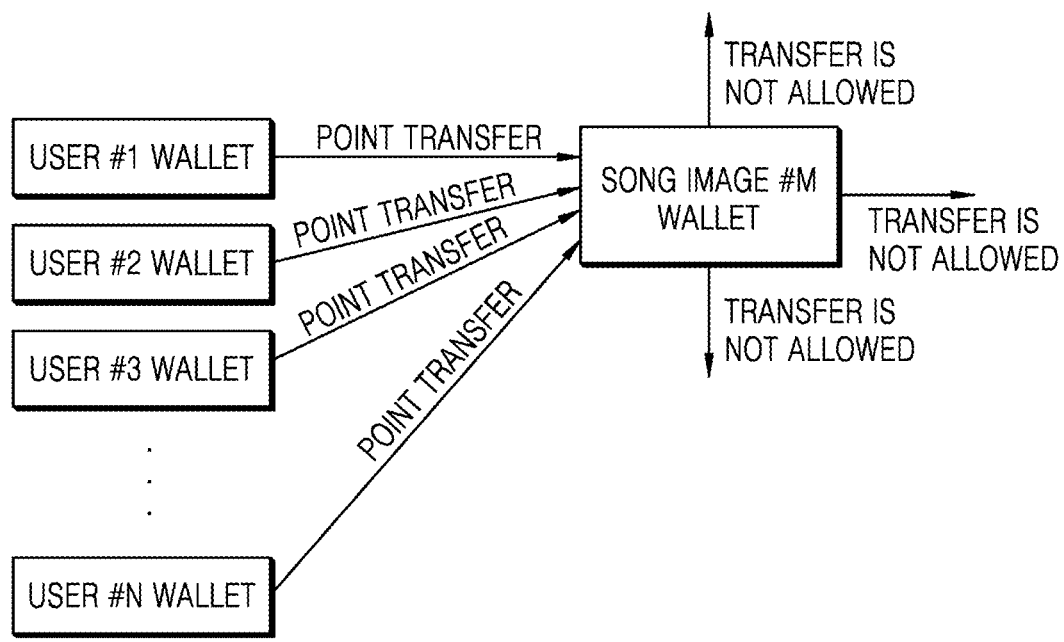
FIG. 22 schematically shows transfers of points related to user wallets and a song image wallet according to one embodiment of the present invention.

FIG. 22 schematically shows transfers of points related to user wallets and a song image wallet according to one embodiment of the present invention.

When the transaction receiving step S2000 and the record requesting step S3000 are performed according to the posting step S100, the first sponsorship step S200, and the second sponsorship step S300, the transfers of points from wallets of users to a wallet of a specific song image are recorded in the block as shown in FIG. 22.

In other words, points held by the wallet of the corresponding song image may be increased by the transaction receiving step and the record requesting step according to an input of sponsorship for the corresponding song image of the user terminal during the predetermined sponsorship period.

Preferably, the points held in the wallet of the corresponding song image are not allowed to be transferred to other external wallets during the predetermined sponsorship period. In other words, from the start of the posting step S100 to the completion of the second sponsoring step S300, the points transferred from the external wallets to the wallet of the song image are only retained in the wallet of the song image, and the transfer to the outside is not allowed.

Accordingly, when the posting and sponsoring become active, the issued points, that is, virtual currencies are held in a wallet in which the transfer is impossible for a predetermined period. Accordingly, the amount of virtual currency that can be circulated is decreased, and accordingly, points in the karaoke application, that is, the value of virtual currency may be increased, so that user inflows into the karaoke application and activities may be further promoted in a virtuous cycle.

Figure 23:
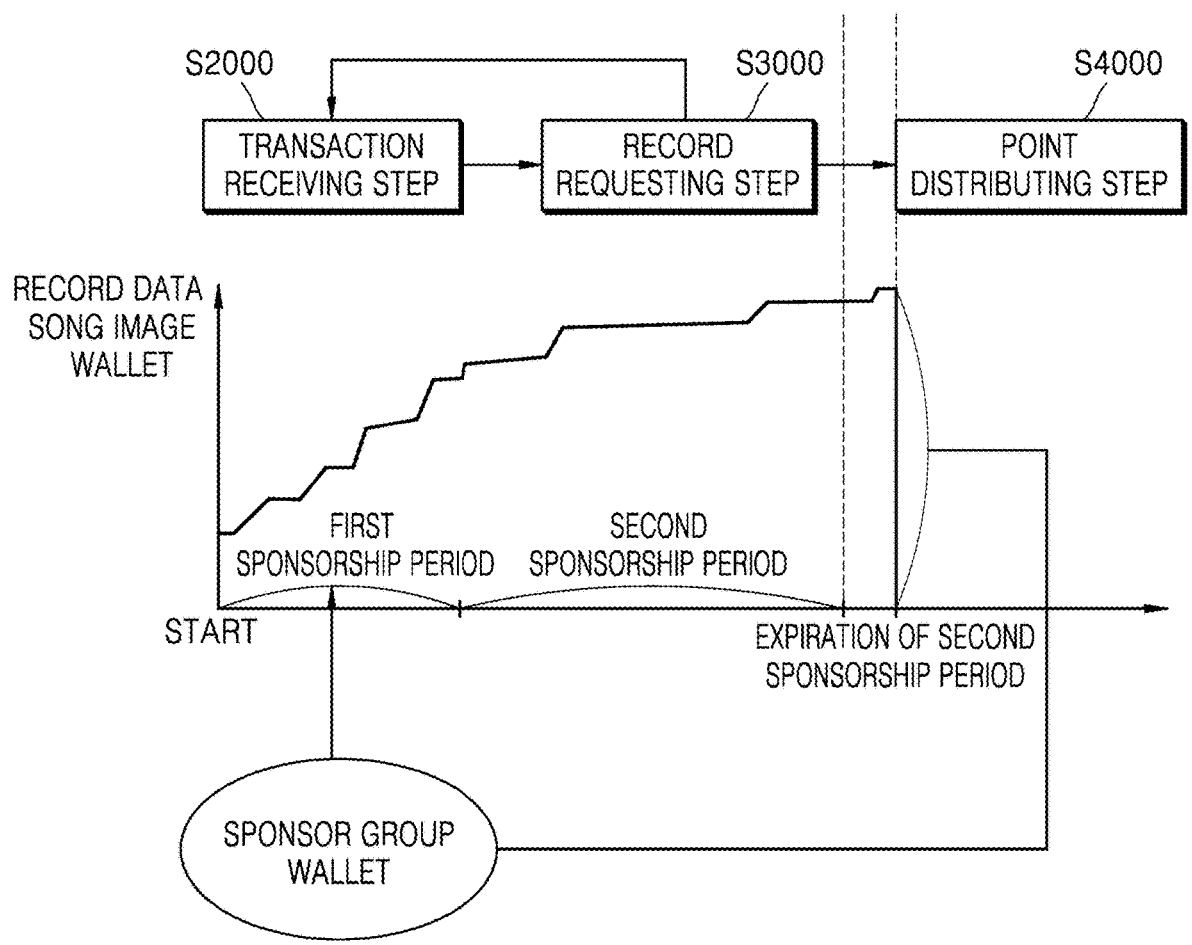
FIG. 23 schematically shows a status of points in the song image wallet according to the steps of the method for managing the points according to one embodiment of the present invention.

FIG. 23 schematically shows a status of points in the song image wallet according to the steps of the method for managing the points according to one embodiment of the present invention.

As shown in FIG. 23, the wallet of the corresponding song image has holding points increased according to the execution of the transaction receiving step and the record requesting step according to the posting, the first sponsorship, the second sponsorship, and the like. As described above, the points once transferred to the song image wallet are not transferred to the external wallet until the sponsorship period is completed.

Thereafter, according to one embodiment of the present invention, when the point distribution proceeds, the points transferred to the corresponding song image for the predetermined period are transferred to the wallet of the users having performed the sponsorship.

Preferably, in step S3000, information on whether the transfer of the corresponding points is subject to the posting, whether the transfer is subject to the sponsorship during the first sponsorship period, or whether the transfer is subject to the sponsorship during the second sponsorship period is recorded in the block. Accordingly, the distribution of points according to step S4000 may be performed fairly in consideration of the size of the points that the user sponsors in the wallet of the user having performed the sponsorship in the first sponsorship period.

Figure 24:
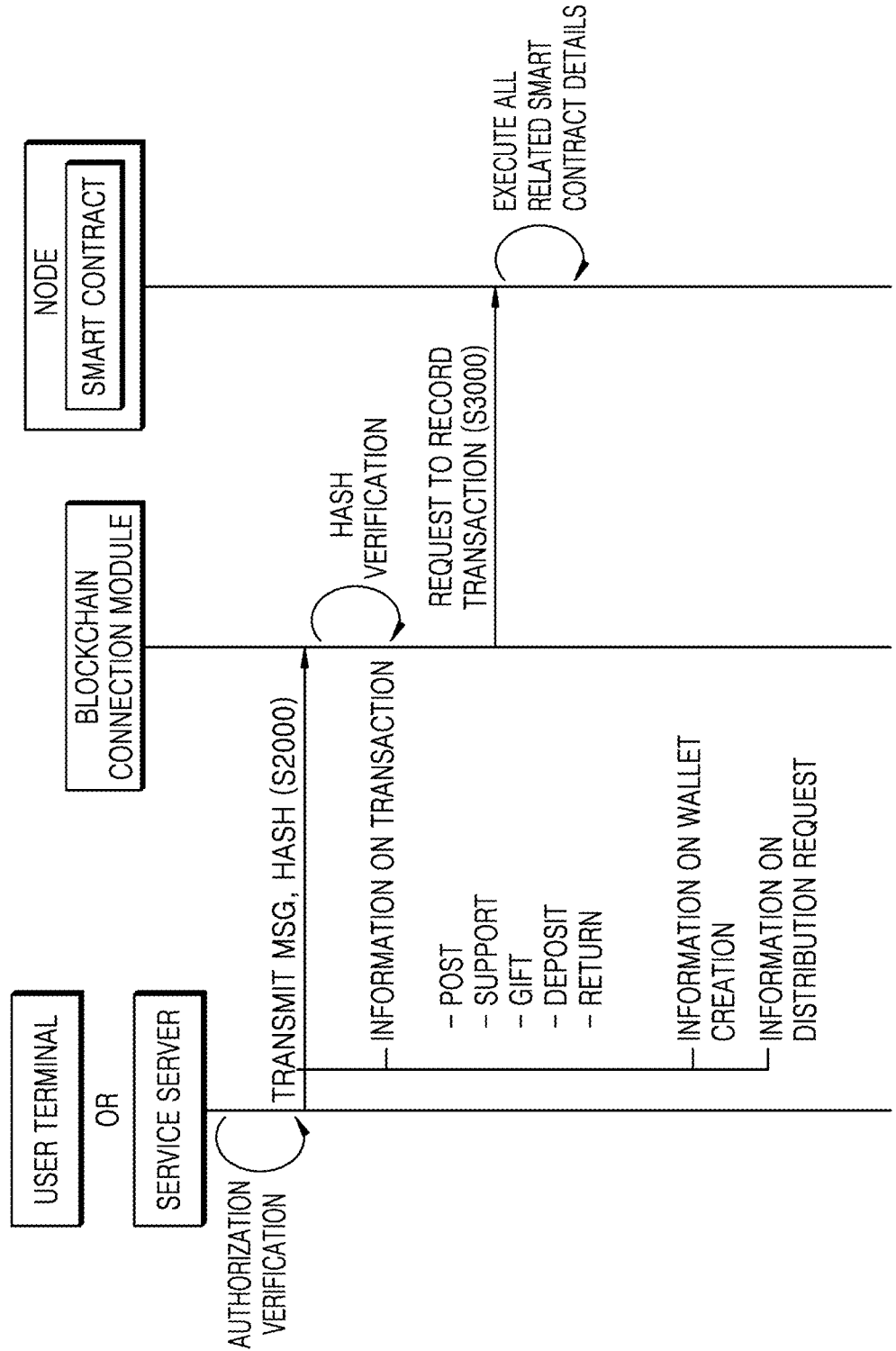
FIG. 24 schematically shows interaction of the smart contract module in the node of the blockchain connection module according to one embodiment of the present invention.

FIG. 24 schematically shows interaction of the smart contract module in the node of the blockchain connection module 1300 according to one embodiment of the present invention.

In FIG. 24, the blockchain connection module 1300 receives request data related to the transfer of points from the service server 1000 or the user terminal.

The above request data may include a hash value for information related to the transfer of points, and information related to the transfer of points. Preferably, the request data may include digital signature data for the information related to the transfer of points. In this case, the hash value may correspond to a hash value reflecting the digital signature data.

The information related to the transfer of points may correspond to the above-described information about the transaction, and the operation may be implemented by the above-described transaction receiving step.

In other words, the information about the transaction may include: information related to a wallet of the specific user information related to a wallet of the specific song image; information about transferred points; and a hash value for at least one of the information related to the wallet of the specific user, the information related to the wallet of the specific song image, and the information about the transferred points.

In addition, according to one embodiment of the present invention, the transaction may include: a posting transaction in which a provider of the corresponding song image transfers points from a wallet of the provider to the wallet of the corresponding song image; a support transaction for transferring points from a wallet of a third user to the wallet of the corresponding song image during a first sponsorship period for the corresponding song image; and a gift transaction for transferring points from a wallet of a third user to the wallet of the corresponding song image during a second sponsorship period after the first sponsorship period for the corresponding song image; a deposit transaction in which the user who wants to store the corresponding song image in the server system transfers points from the wallet of the user to the deposit wallet at a cost for storing the corresponding song image in the server system; and a recovery transaction in which points are transferred from the deposit wallet to the wallet of the user who wants to store the corresponding song image in the server system.

Thereafter, the blockchain connection module 1300 verifies the hash value of the received request data, and requests the corresponding transaction record to the connected node (S3000).

The nodes of the blockchain network includes a smart contract module for recording the transfers of the points according to the posting transaction, the support transaction, the gift transaction, the deposit transaction, the recovery transaction, and the like in a block of the blockchain network, and in the record request step S3000, the smart contract module requests to perform a function according to the transaction based on the information about the transaction.

Accordingly, the node creates a block in which these transactions are reflected.

Figure 25:
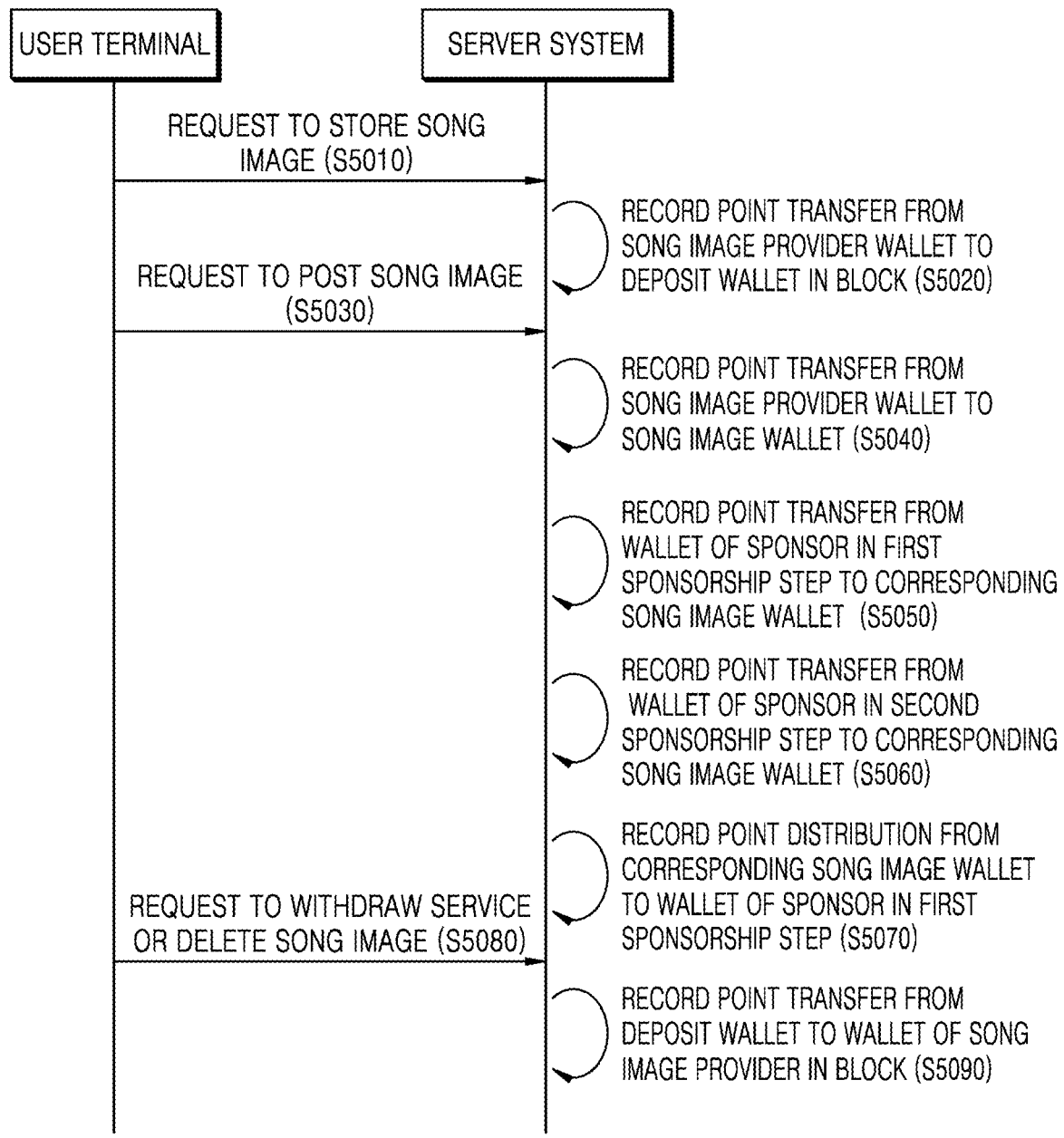
FIG. 25 schematically shows a process of depositing points according to operations such as storing song images in the server system according to one embodiment of the present invention.

FIG. 25 schematically shows a process of depositing points according to operations such as storing song images in the server system according to one embodiment of the present invention.

As described above, the corresponding song image may be stored in the server system by an input of the user in the karaoke application. The above operation is performed by step S5010.

Meanwhile, information about points of a deposit wallet for receiving deposit points for the stored song images is recorded in the blockchain network. The deposit wallet may correspond to the wallet of the service operating entity of the karaoke application.

In step S5020, recording, for a deposit transaction in which the user who wants to store the corresponding song image in the server system transfers points from the wallet of the user to the deposit wallet at a cost for storing the corresponding song image in the server system, is performed in the block.

Thereafter, in step S5030, the service server 1000 discloses the song image (performs posting) so that a third user may access, and in step S5040, recording for the posting transaction is performed in the block.

Thereafter, in steps S5050 and S5060, recording for the support transaction and the gift transactions according to the first and second sponsorship steps is performed in the block.

Thereafter, in step S5070 after the expiration of the sponsorship period, the distribution transaction according to the distribution of points to the sponsors related to the corresponding points is recorded in the block.

Thereafter, in step S5080, requests such as service withdrawal or deletion of song images from the server system are received by the server system, and in step S5090, the points transferred to the deposit wallet in step S5020 are transferred back to the wallet of the corresponding song image provider.

In other words, the transaction performed in the server system includes a recovery transaction in which points are transferred from the deposit wallet to the wallet of the user who wants to store the corresponding song image in the server system, wherein the recovery transaction may be performed when the user withdraws from a use of the karaoke application or deletes the corresponding song image from a server.

FIG. 26 schematically shows state changes in the money supply for the points managed in the server system according to one embodiment of the present invention.

Figure 26A:
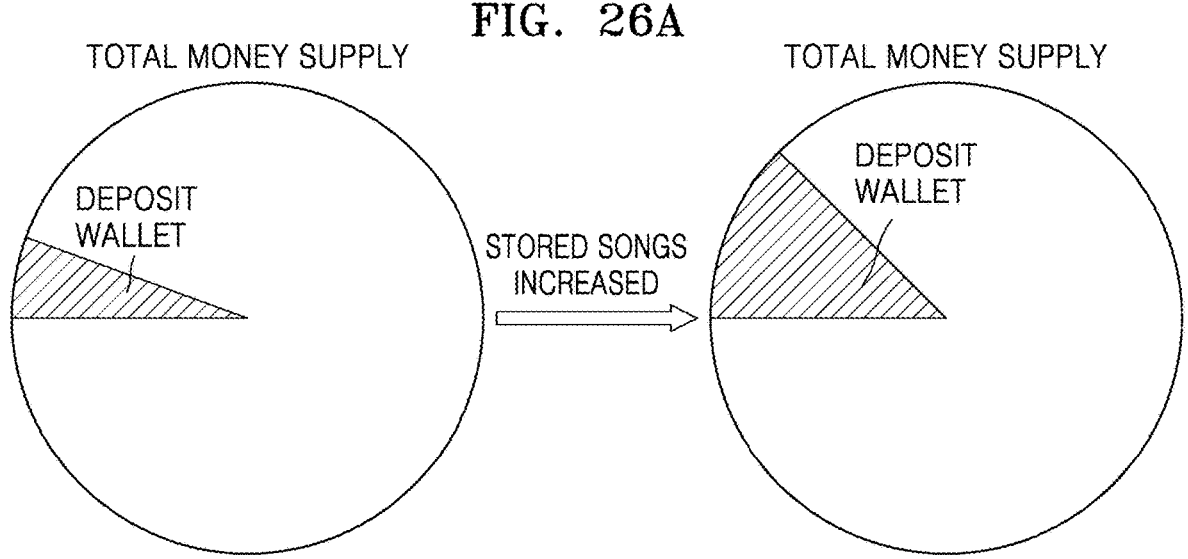
FIG. 26 schematically shows state changes in the money supply for the points managed in the server system according to one embodiment of the present invention.

As shown in FIG. 26(A), when more song images are stored in the server system, the percentage of points held in the deposit wallet is increased based on the total amount of points that can be implemented as virtual currency.

Figure 26B:
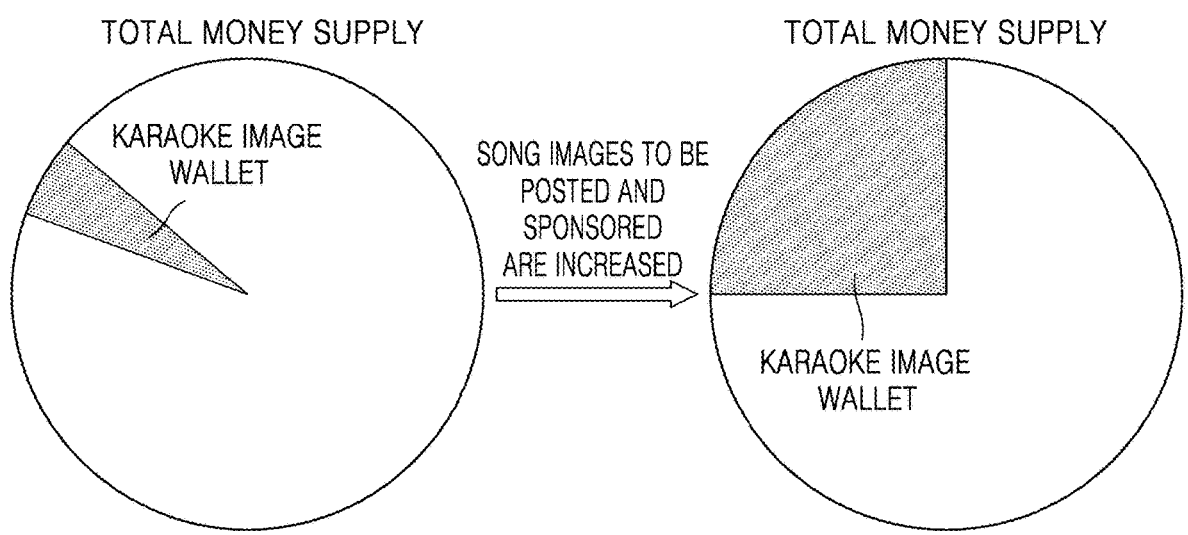

Meanwhile, as shown in FIG. 26(B), the percentage of points held in a plurality of song image wallets is increased based on the total amount of points that can be implemented as virtual currency, as more postings and sponsorships are performed in the server system.

Figure 26C:
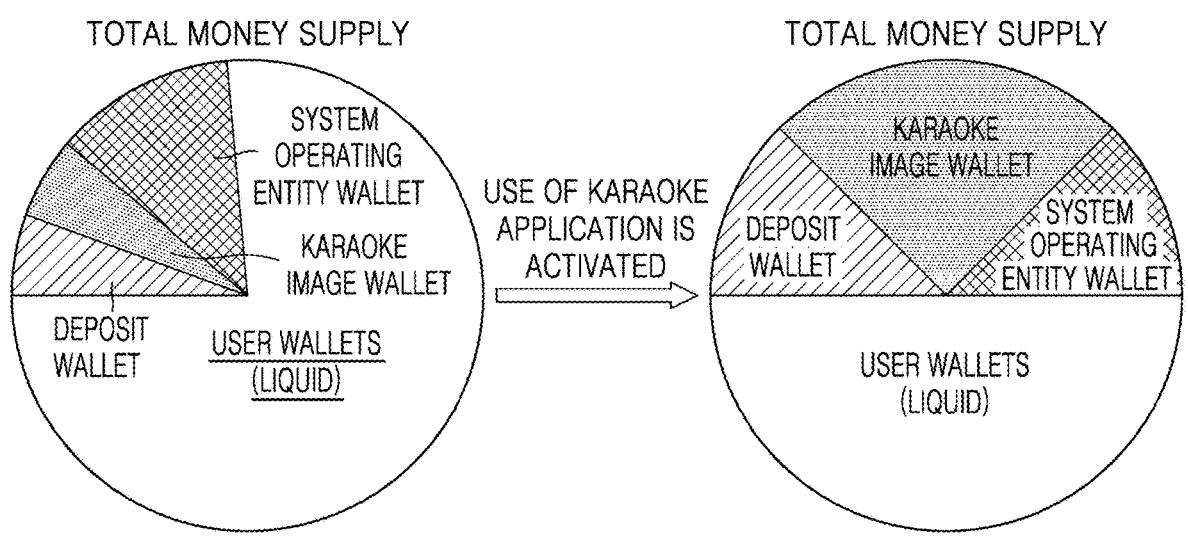

FIG. 26(C) shows a state in which the holding ratio of the deposit wallet and the holding ratio of the song image wallet in the total money supply are simultaneously considered. In FIG. 26(C), the user wallet (to be liquid) may correspond to the money supply held in the system operating entity wallet, karaoke image wallet, the deposit wallet, or the liquid money supply excluding coins or the amount of coins, based on the total money supply.

In FIG. 26(C), when it is assumed that the wallet of the system operating entity is maintained at the same rate, and there is no change in the total money supply, as the karaoke application is used more actively, the amount of points held in the deposit wallet and the song image wallet is increased among the total money supply, and accordingly, the amount of points that can be held in the user's wallet is inevitably reduced.

Since the points used in posting and sponsoring in the karaoke application of the present invention are managed in the blockchain network, the fairness of the ledger can be ensured, the forgery and falsification of the point transfer details can be objectively prevented, and the points can be exchanged for cash, other virtual currencies, and the like in other exchange systems.

Meanwhile, the operation of song wallets, deposit wallets and the like in the karaoke application of the present invention, results in staking some of the liquid virtual currency (points) for a predetermined period of time, thereby decreasing the amount of liquid virtual currency (points) held in the user wallet and increasing the scarcity of the virtual currency (points), and accordingly, the value of virtual currency (points) is further increased, thereby serving as an incentive to induce more users into the karaoke application and activate the activities.

Figure 27:
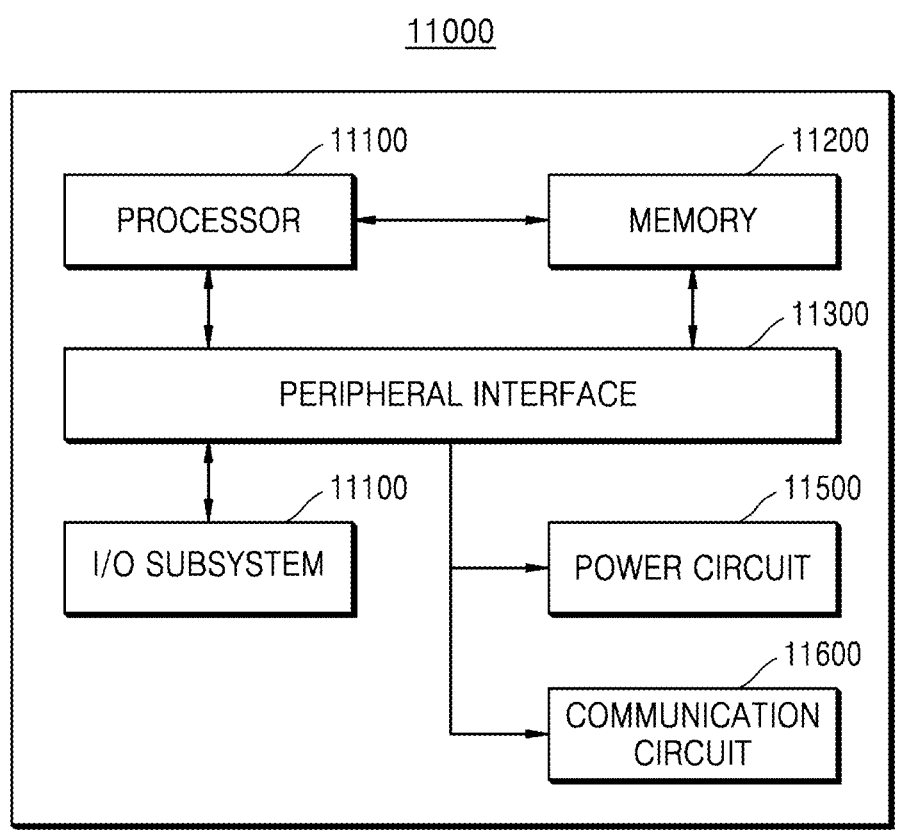
FIG. 27 schematically shows the internal configuration of a computing device according to one embodiment of the present invention.

FIG. 27 schematically shows the internal configuration of a computing device according to one embodiment of the present invention. The computing device of FIG. 27 may correspond to an example of an internal component of the server system constituting the above-described server system, for example, a hardware configuration of the service server 1000 or the node. Alternatively, the computing device shown in FIG. 27 may correspond to an internal component of the service server 1000 or the node, or the blockchain connection module 1300.

As shown in FIG. 27, the computing device 11000 may at least include at least one processor 11100, a memory 11200, a peripheral interface 11300, an I/O subsystem 11400, a power circuit 11500, and a communication circuit 11600.

The memory 11200 may include for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100. The processor 11100 may be configured in a single processor or a plurality of processors, and may include a GPU and a TPU type processor to improve the processing speed.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The I/O subsystem 11400 may combine various input/output peripheral devices to the peripheral interface 11300. For example, the input/output subsystem 11400 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem 11400.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or any other components for generating, managing, and distributing the power.

The communication circuit 11600 may use at least one external port, thereby enabling communication with other computing devices.

Alternatively, as described above, the communication circuit 11600 may include an RF circuit, if needed, to transmit and receive an RF signal, also known as an electromagnetic signal, thereby enabling communication with other computing devices.

The embodiment of FIG. 27 is merely an example of the computing device 11000, and the computing device 11000 may have a configuration or arrangement in which some components shown in FIG. 27 are omitted, additional components not shown in FIG. 27 are further provided, or at least two components are combined. For example, a computing device for a communication terminal in a mobile environment may further include a touch screen, a sensor or the like in addition to the components shown in FIG. 27, and the communication circuit 1160 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The above-mentioned devices may be implemented by hardware components, software components, and/or a combination of hardware components and software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases for the processing device may have described that one processing device is used, however, those skilled in the art will be appreciated that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, an instruction, or a combination of at least one thereof, and may configure the processing device to operate as desired, or may instruct the processing device independently or collectively. The software and/or data may be permanently or temporarily embodied in any type of machine, component, physical device, virtual equipment, computer storage media or device, or in a signal wave to be transmitted, in order to be interpreted by the processor or to provide instructions or data to the processor. The software may be distributed over computing devices connected to networks, so as to be stored or executed in a distributed manner. The software and data may be stored in at least one computer-readable recording media.

The method according to the embodiment may be implemented in the form of program instructions to be executed through various computing mechanisms so as to be recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. An example of the computer-readable medium includes a magnetic media such as a hard disk, a floppy disk and a magnetic tape, an optical media such as a CD-ROM and a DVD, a magneto-optical media such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The hardware device may be configured to operate as at least one software module to perform the operations of the embodiments, and vice versa.

Although the above embodiments have been described with reference to the limited embodiments and drawings, it will be understood by those skilled in the art that various changes and modifications may be made from the above-mentioned description For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other embodiments, and equivalents to the claims are also within the scope of the following claims.

The invention claimed is:

1. A method for managing points in a karaoke application using a blockchain network and performed in a server system, the method comprising:
   a transaction receiving step, said transaction containing information about a transfer of value and data on the blockchain network, comprising the steps of:
   allowing a user using the karaoke application on a user terminal to post about a song image of the user or perform sponsorship for a song image of another user, wherein the server system includes one or more user digital wallets, a system digital wallet, and one or more song image digital wallets, each containing unique digital address to identify the digital wallet and points information, allowing the user to interact with the blockchain network;
   wherein points held for each user's
digital wallet and points held for each digital wallet of the posted song images are recorded in the blockchain network, and
   wherein a public key is associated with the digital address of the digital wallet, and transaction data is hashed and encrypted using a private key;
   a receiving step, by a blockchain connection module, of receiving the transaction data and an encrypted hash value derived from the transaction data, wherein the blockchain connection module verifies authenticity of the transaction data by decrypting the encrypted hash value using the public key and comparing the decrypted hash value with a hash value derived from the transaction data received;
   a record requesting step of requesting one or more nodes of the blockchain network to perform recording in a corresponding block of the blockchain network based on the transaction data; and
   a point distributing step of automatically transferring predefined portions of the stored points from the wallet of the song image to (1) digital wallets of one or more users who have sponsored the song image and (2) a digital wallet of a user who provided the song image, respectively, after the predetermined sponsorship period for the song image has expired.

2. The method of claim 1, further comprising:
   a wallet creation step of requesting one or more nodes of the blockchain network to create a new wallet according to a join of a new user, and transmitting private key information for the new wallet received from the one or more nodes to a user terminal.

3. The method of claim 1, wherein points held by the wallet of the song image are increased by the transaction receiving step and the record requesting step according to an input of the sponsorship for the song image of the user terminal during a predetermined sponsorship period, and
   the points held in the wallet of the song image are not allowed to be transferred to other external wallets during the predetermined sponsorship period.

4. The method of claim 1, wherein a transfer of a part of the points held in the wallet of the song image to wallets of some of users sponsoring the song image and a wallet of a user providing the song image is recorded in the blockchain network by the smart contract module after expiration of the predetermined sponsorship period for the song image set in the server system.

5. The method of claim 1, wherein the information about the transaction in the transaction receiving step includes:
   information related to a wallet of a specific user;
   information related to a wallet of a specific song image;
   information about transferred points; and
   a hash value for at least one of the information related to the wallet of the specific user, the information related to the wallet of the specific song image, and the information about the transferred points.

6. The method of claim 1, wherein the transaction includes:
   a posting transaction in which a provider of the song image transfers points from a wallet of the provider to the wallet of the song image;
   a support transaction for transferring points from a wallet of a third user to the wallet of the song image during a first sponsorship period for the song image; and
   a gift transaction for transferring points from a wallet of a third user to the wallet of the song image during a second sponsorship period after the first sponsorship period for the song image.

7. The method of claim 6, wherein the nodes of the blockchain network include a smart contract module for recording the transfers of the points according to the posting transaction, the support transaction, and the gift transaction in a block of the blockchain network, and
   the record requesting step includes requesting the smart contract module to perform a function according to the transaction based on the information about the transaction.

8. The method of claim 1, wherein the song image is configured to be stored in the server system by an input of the user in the karaoke application,
   information about points of a deposit wallet for receiving deposit points for the stored song images is recorded in the blockchain network, and
   the transaction includes:
   a deposit transaction in which the user who wants to store the song image in the server system transfers points from the wallet of the user to the deposit wallet at a cost for storing the song image in the server system; and a recovery transaction in which points are transferred from the deposit wallet to the wallet of the user who wants to store the song image in the server system, in which the recovery transaction is performed when the user withdraws from a use of the karaoke application or deletes the song image from a server.

9. A system for managing points in a karaoke application using a blockchain network and implemented by a server system, the system comprising:

one or more computers; and one or more computer memory devices interoperably coupled with the one or more computers and having tangible, non-transitory, machine-readable media storing one or more instructions that, when executed by the one or more computers, perform one or more operations comprising:

a transaction receiving step, said transaction containing information about a transfer of points and data on the blockchain network, comprising steps of:

allowing a user using the karaoke application on a user terminal to post about a song image of the user or submit sponsorship request for a song image of another user, wherein the server system includes one or more user digital wallets, a system digital wallet, and one or more song image digital wallets, each containing a unique digital address to identify the digital wallet and points information, allowing the user interact with the blockchain network;

wherein information about points held for each user's digital wallet and information about points held for each digital wallet of the posted song images are recorded in the blockchain network; and wherein a public key is associated with the digital address of the digital wallet, and transaction data is hashed and encrypted using a private key;

a receiving step, by a blockchain connection module, of receiving transaction data and an encrypted hash value from the received transaction data, wherein the blockchain connection module verifies authenticity of the transaction data by decrypting the encrypted hash value using the public key and comparing the decrypted hash value with a hash value derived from the transaction data received;

a record requesting step of requesting one or more nodes of the blockchain network to perform recording in a corresponding block of the blockchain network based on the transaction data; and a point distributing step of automatically transferring a specified portion of the stored points from the wallet of the specific song image to (1) digital wallets of one or more users who have sponsored the song image and (2) a digital wallet of a user who provided the song image, respectively, after the predetermined sponsorship period for the song image has expired.

* * * * *